(12) United States Patent
Williams et al.

(10) Patent No.: US 9,196,005 B2
(45) Date of Patent: Nov. 24, 2015

(54) VENDING KIOSK USER INTERFACE SYSTEMS AND METHODS

(71) Applicant: Verizon and Redbox Digital Entertainment Services, LLC, Basking Ridge, NJ (US)

(72) Inventors: Gareth Williams, Orange, CA (US); Brian F. Roberts, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 270 days.

(21) Appl. No.: 13/891,482

(22) Filed: May 10, 2013

(65) Prior Publication Data

US 2014/0333664 A1    Nov. 13, 2014

(51) Int. Cl.
*G09G 5/00* (2006.01)
*G06Q 30/06* (2012.01)

(52) U.S. Cl.
CPC .................................. *G06Q 30/0643* (2013.01)

(58) Field of Classification Search
CPC .................................................... G06T 19/006
See application file for complete search history.

(56) References Cited

U.S. PATENT DOCUMENTS

| | | | |
|---|---|---|---|
| 8,624,725 B1* | 1/2014 | MacGregor | 340/539.13 |
| 2008/0094417 A1* | 4/2008 | Cohen | 345/632 |
| 2012/0223943 A1* | 9/2012 | Williams et al. | 345/419 |
| 2012/0239504 A1* | 9/2012 | Curlander et al. | 705/14.66 |
| 2012/0256954 A1* | 10/2012 | Soon-Shiong | 345/633 |
| 2012/0327119 A1* | 12/2012 | Woo et al. | 345/633 |
| 2013/0032634 A1* | 2/2013 | McKirdy | 235/375 |
| 2013/0141428 A1* | 6/2013 | Gipson | 345/419 |
| 2014/0085333 A1* | 3/2014 | Pugazhendhi et al. | 345/633 |
| 2014/0236475 A1* | 8/2014 | Venkatraman et al. | 701/420 |

* cited by examiner

*Primary Examiner* — Ryan R Yang

(57) ABSTRACT

An exemplary method includes a computer-implemented vending kiosk user interface system 1) receiving a camera image captured by a mobile device, the camera image including a visual representation of a vending kiosk located within a vicinity of the mobile device, 2) detecting the visual representation of the vending kiosk within the camera image, 3) generating, based on the detecting of the visual representation of the vending kiosk within the camera image, an augmented reality image that includes a combination of camera image content included in the camera image and virtual content associated with a vending service, and 4) directing the mobile device to display the augmented reality image. Corresponding methods and systems are also disclosed.

22 Claims, 18 Drawing Sheets

VENDING KIOSK USER INTERFACE SYSTEMS AND METHODS

BACKGROUND INFORMATION

Vending kiosks are a common way to distribute certain types of consumer goods. For example, Redbox® kiosks, which vend media discs, have become ubiquitous at grocery stores, fast food restaurants, gas stations, and other locations. Such a vending kiosk typically has an integrated user interface for use by a person to interact with the vending kiosk when the person is physically located at the vending kiosk (e.g., by the person pressing buttons on the vending kiosk).

Unfortunately, a person may have to wait in a line of people before being able to utilize a conventional integrated user interface to interact with a vending kiosk. Consequently, the person may have to wait in line before being able to discover what options are available at the vending kiosk (e.g., before being able to discover what movies or video games are currently available at a media vending kiosk). Moreover, once the person reaches the front of the line and is able to utilize the conventional integrated user interface to interact with the vending kiosk, the person may feel rushed while a line of one or more other people waits behind him or her (e.g., the person may hurriedly try to find an available movie or game that is in stock in a media vending kiosk and that is of interest to the person).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
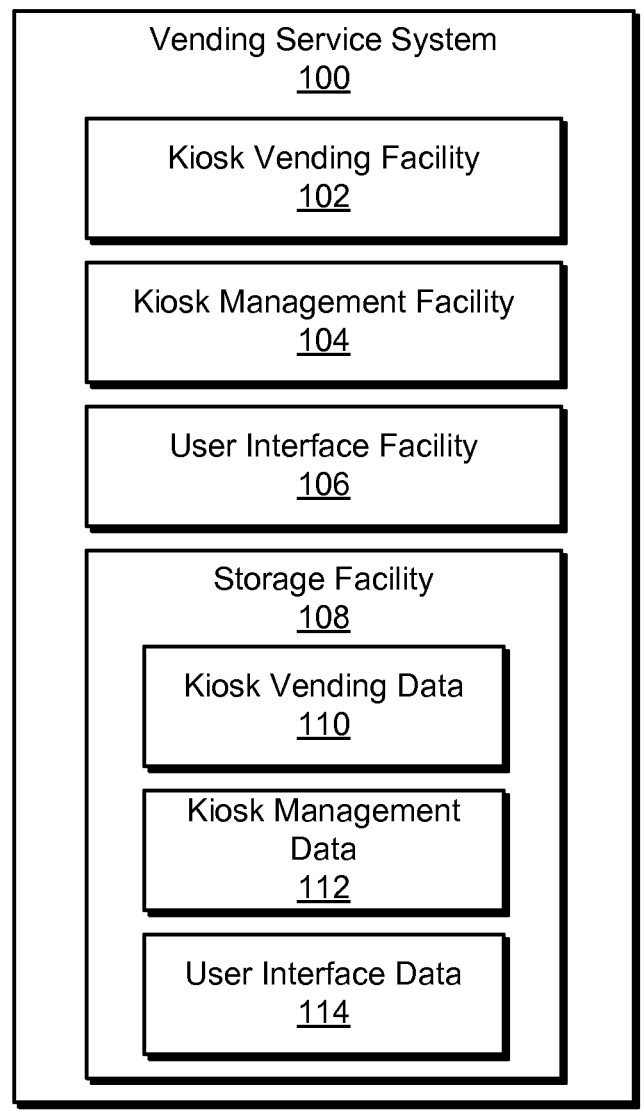
FIG. 1 illustrates an exemplary vending service system according to principles described herein.

Exemplary vending kiosk user interface systems and methods are described herein. In certain examples, the exemplary systems and methods described herein may provide a vending kiosk user interface that includes an augmented reality image configured to facilitate interaction with a vending kiosk and/or a vending service by a user utilizing a mobile device located within a vicinity of the vending kiosk. For example, a vending kiosk user interface system may detect a visual representation of a vending kiosk in a camera image captured by a mobile device located within a vicinity of the vending kiosk, generate an augmented reality image that includes a combination of camera image content of the camera image and virtual content associated with a vending service, and direct the mobile device to display the augmented reality image.

To illustrate one example, a user of a mobile device may enter within a predefined geographic vicinity of a vending kiosk. An exemplary system may detect that the mobile device is located within the vicinity of the vending kiosk and, in response, notify the user of the mobile device that an augmented reality user interface associated with the vending kiosk and/or a vending service associated with the vending kiosk is available and provide the user with an option to access the augmented reality user interface. In response to a user selection of the option, the system may instruct the user to utilize the mobile device (e.g., a camera included in the mobile device) to capture a camera image of the vending kiosk. The user may follow the instruction and utilize the mobile device to capture a camera image that includes a visual representation of the vending kiosk. The system may receive the camera image, detect the visual representation of the vending kiosk in the camera image, generate an augmented reality image that includes a combination of camera image content of the camera image and virtual content associated with the vending service (e.g., virtual content representing inventory of the vending service or the vending kiosk), and direct the mobile device to display the augmented reality image.

As described herein, virtual content included in a vending-kiosk-based augmented reality image may be configured to facilitate user interaction with a vending kiosk and/or a vending service by way of a mobile device located in a vicinity of the vending kiosk. This may allow a user to interact with a vending kiosk and/or a vending service associated with the vending kiosk while the user is located within the vicinity of the vending kiosk (e.g., within line of sight of the vending kiosk), such as when the user is standing in line waiting to use the vending kiosk, and without having to physically interact with a user interface integrated within the vending kiosk. Accordingly, where the vending kiosk comprises an automatic media vending machine, the user may be able to access inventory items (e.g., movies, television shows, games, etc.) associated with the vending machine, such as by using a vending kiosk user interface provided by way of a mobile device to discover, reserve, purchase, and/or lease any of the inventory items when the mobile device is within a vicinity of the vending machine. For example, the user may utilize a mobile device to browse or search the current inventory of the vending kiosk and/or to reserve, purchase, or lease a current inventory item. When the user reaches the vending kiosk, the reserved, purchased, or leased inventory item may be ready for pickup by the user.

Examples of vending kiosk user interface systems and methods, as well as exemplary views of vending kiosk graphical user interfaces ("GUIs") provided by the systems and methods will now be described in reference to the accompanying drawings.

FIG. 1 illustrates an exemplary vending service system 100 ("system 100"). System 100 may be configured to perform one or more operations to provide a vending service offered by a vending service provider to one or more users. To this end, system 100 may include one or more physical vending kiosks configured to vend kiosk inventory items to users of the vending service. System 100 may also provide one or more user interfaces for use by the users to interact with the vending service and/or the vending kiosks. As described herein, an exemplary user interface may include an augmented reality user interface having an augmented reality image configured to facilitate user interaction with a vending kiosk and/or the vending service by way of a mobile device that is located in a vicinity of the vending kiosk. Through such interaction, a user may access vending kiosk inventory items, such as by discovering, reserving, purchasing, and/or leasing vending kiosk inventory items that are of interest to the users. Examples of such user interfaces are described herein.

As shown in FIG. 1, system 100 may include, without limitation, a kiosk vending facility 102, a kiosk management facility 104, a user interface facility 106, and a storage facility 108 selectively and communicatively coupled to one another. The facilities may be communicatively coupled one to another by any suitable communication technologies. Storage facility 108 may be configured to store kiosk vending data 110, kiosk management data 112, and user interface data 114, examples of which are described herein. Storage facility 108 may maintain additional or alternative data as may serve a particular implementation.

Kiosk vending facility 102 may be configured to perform one or more operations to vend kiosk inventory items to users of the vending service. For example, kiosk vending facility 102 may include one or more physical vending kiosks (e.g., a network of geographically distributed vending kiosks) configured to vend kiosk inventory items to users of the vending service. In certain implementations, the vending kiosks may include geographically distributed automated vending machines, such as automated media vending machines, configured to vend kiosk inventory items to users of the vending service. For example, the vending kiosks may include a network of geographically distributed automated vending machines configured to vend media content such as movies, television programs, and/or video games to users of the vending service (e.g., automated media disc vending machines configured to vend media discs carrying such media content to users of the vending service).

Kiosk inventory items may include any consumer goods capable of being distributed by a vending kiosk such as an automated vending machine. In certain examples, the kiosk inventory items may include, without limitation, instances of media content such as movies, television programs, audio programs, video programs, video games, etc. in any format (e.g., digital licenses of such instances of media content, physical carriers such as Digital Versatile Disc ("DVD") and/or Blu-Ray discs that carry data representative of such instances of media content, etc.) that may be vended by a vending kiosk. In other examples, vending kiosks may vend other consumer goods, such as food (e.g., snack foods), electronic equipment (e.g., headphones, media player devices, etc.), software, digital content, or any other consumer goods capable of being vended by a vending kiosk.

Kiosk vending facility 102 may be configured to generate, provide, or otherwise manage kiosk vending data 110, which may include any data related to vending operations of kiosk vending facility 102. For example, kiosk vending facility 102 may generate kiosk vending data 110 representative of vending transactions performed by kiosk vending facility 102.

Kiosk vending facility 102 may be configured to perform one or more vending operations based on communications received from kiosk management facility 104 and/or user interface facility 106. For example, user interface facility 106 may receive a user request to access a kiosk inventory item. User interface facility 106 may communicate with kiosk vending facility 102 to initiate performance of one or more vending operations by kiosk vending facility 102 in order to fulfill the request.

Kiosk management facility 104 may be configured to manage one or more vending kiosks. To this end, kiosk management facility 104 may maintain kiosk management data 112 that specifies information about vending kiosks associated with a vending service. The information may include, without limitation, information about geographic locations, operational statuses, inventories, accumulated sales, identifiers, attributes, etc. of the vending kiosks. As an example, kiosk management facility 104 may maintain Global Positioning System ("GPS") coordinates or other geographic location data specifying geographic locations of geographically distributed vending kiosks.

As another example, kiosk management facility 104 may maintain data specifying a general inventory of items associated with the vending service (e.g., a general inventory of items currently offered and/or planned to be offered by the vending service). The general inventory of a vending kiosk may include any inventory items offered for vending by the vending kiosk (including in-stock and out-of-stock items), inventory items offered for vending as part of the vending service, and/or inventory items planned to be offered for vending by the vending kiosk or as part of the vending service. Thus, the term "general inventory" may refer to inventory of the vending service or a particular vending kiosk as a whole and may include current and/or planned inventory of the vending service or kiosk.

As another example, kiosk management facility 104 may maintain data specifying current inventories (e.g., real time or near real time inventories) of specific vending kiosks. The current inventory of a specific vending kiosk may refer to the set of inventory items currently in stock within and available for immediate vending by the vending kiosk.

User interface facility 106 may be configured to provide one or more vending kiosk user interfaces through which users of the vending service may interact with the vending service and/or a vending kiosk. For example, as mentioned, user interface facility 106 may be configured to provide an augmented reality user interface having one or more vending-kiosk-based augmented reality images configured to facilitate user interaction with the vending service and/or a vending kiosk by way of a mobile device located within a vicinity of a vending kiosk. Examples of such a user interface are described herein.

User interface facility 106 may be configured to generate, provide, or otherwise manage user interface data 114, which may include any data related to a user interface provided by user interface facility 106. For example, user interface data 114 may include data representative of graphical objects and/or visual representations that may be included in a user interface generated by user interface facility 106. User interface data 114 may additionally or alternatively include data representing a user interface generated by user interface facility 106.

Figure 2:
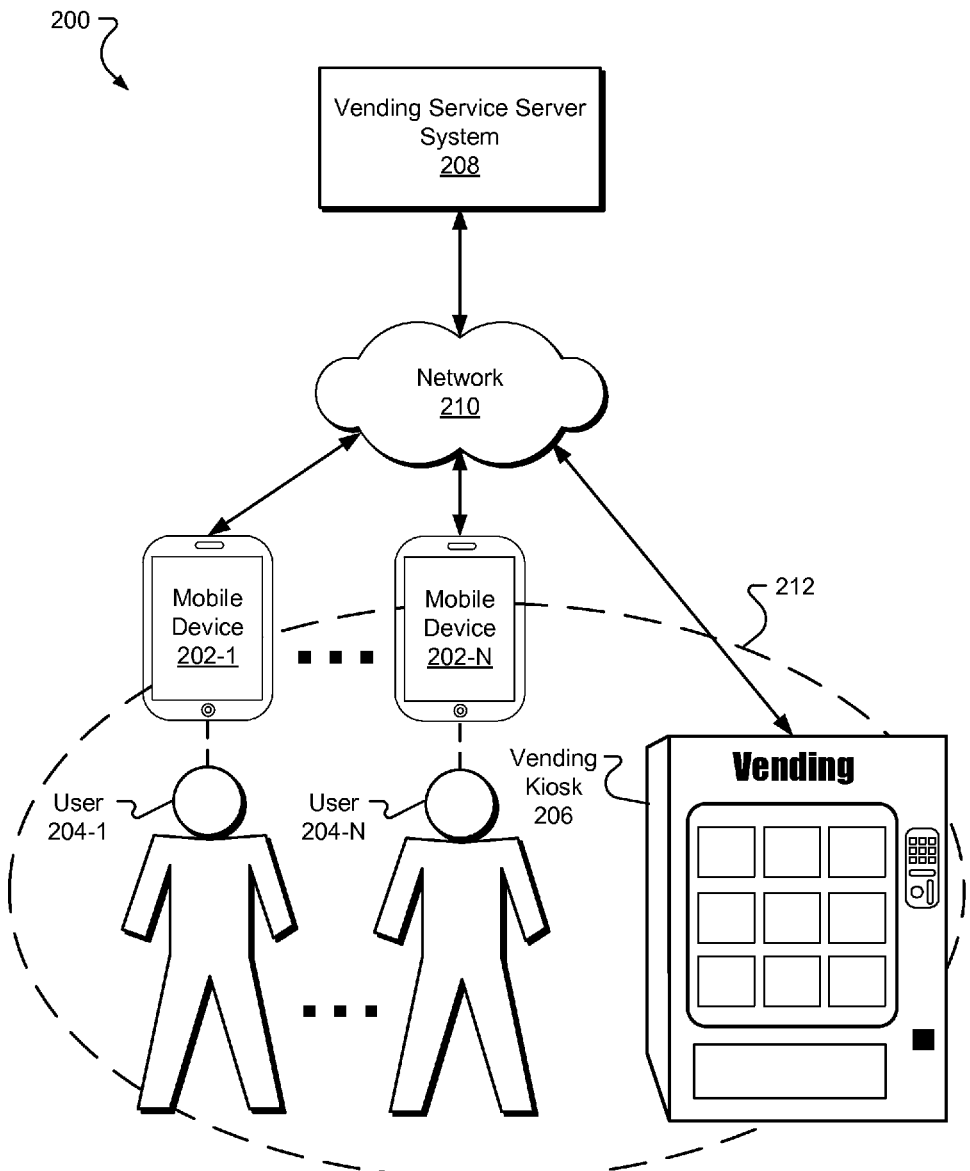
FIG. 2 illustrates an exemplary implementation of the system of FIG. 1 according to principles described herein.

FIG. 2 illustrates an exemplary implementation 200 of system 100. As shown, implementation 200 may include mobile devices 202 (e.g., mobile devices 202-1 through 202-N) respectively associated with users 204 (e.g., users 204-1 through 204-N), which may be end users and/or potential end users of the vending service provided by system 100. Implementation 200 may further include one or more vending kiosks such as vending kiosk 206, as well as a vending service server system 208 ("server system 208").

In implementation 200, one or more of facilities 102-108 of system 100 may be implemented entirely by a mobile device 202, by vending kiosk 206, by server system 208, or distributed across one or more of mobile devices 202, vending kiosk 206, and server system 208 in any manner configured to facilitate a user 204 accessing the vending service provided by system 100. For example, in certain configurations of implementation 200, user interface facility 106 may be implemented entirely by a mobile device 202, entirely by server system 208, or distributed across a mobile device 202 and server system 208.

Mobile devices 202, vending kiosk 206, and server system 208 may communicate one with another using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Bluetooth technology, wireless communication technologies, Internet communication technologies, and other suitable communications technologies.

In certain embodiments, mobile devices 202, vending kiosk 206, and server system 208 may communicate one with another via a network 210. Network 210 may include one or more networks, such as one or more wireless networks (e.g., Wi-Fi networks), wireless communication networks, mobile telephone networks (e.g., cellular telephone networks), closed media networks, open media networks, closed communication networks, open communication networks, wide area networks (e.g., the Internet), local area networks, short-range wireless networks (e.g., piconets), and any other networks capable of carrying data and/or communications signals between mobile devices 202, vending kiosk 206, and server system 208. Communications between mobile devices 202, vending kiosk 206, and server system 208 may be transported using any one of the above-listed networks, or any combination or sub-combination of the above-listed networks. Alternatively, mobile devices 202, vending kiosk 206, and server system 208 may communicate in another way such as by direct connections between them.

In certain examples, server system 208 may communicate with mobile devices 202 and vending kiosk 206 via network 210 and may facilitate communications between a mobile device 202 and vending kiosk 206 by way of server system 208. Additionally or alternatively, mobile devices 202 and vending kiosk 206 may communicate directly with each other via network 210, without going through server system 208. Additionally or alternatively, mobile devices 202 and vending kiosk 206 may communicate directly with each other via a direct wireless connection without going through network 210.

Server system 208 may include one or more server computing devices located physically remote from vending kiosk 206 and mobile devices 202. Server system 208 may be associated with (e.g., operated by) a provider of the vending service or by another entity. Server system 208 may be configured to manage one or more vending kiosks including vending kiosk 206 (e.g., by maintaining kiosk management data 112, receiving input from vending kiosk 206, and/or providing control commands to vending kiosk 206) and/or to facilitate communications between mobile devices 202 and vending kiosk 206. In certain examples, server system 208 may include a web server and/or an application server.

Vending kiosk 206 may include any physical kiosk configured to vend consumer goods, such as described herein. Vending kiosk 206 may be physically located at a particular geographic location where end users of the vending service may visit and utilize vending kiosk 206 to access kiosk inventory items included in vending kiosk 206.

Mobile device 202 may include any portable computing device that may be transported by a user to a geographic location that is within a geographic vicinity 212 of vending kiosk 206. In FIG. 2, mobile devices 202 are located within the vicinity 212 of vending kiosk 206. As used herein, the term "geographic vicinity," or simply "vicinity," may refer to any defined physical proximity between a mobile device and a vending kiosk, which may be described as a mobile device being within a vicinity of a vending kiosk or as a vending kiosk being within a vicinity of a mobile device. In certain examples, the vicinity may be defined to be limited to line-of-sight between a mobile device and a vending kiosk, which may allow a camera integrated in the mobile device to capture a camera image that includes a visual representation of the vending kiosk.

Mobile device 202 may include a camera integrated therein and usable by a user of the mobile device 202 to capture a camera image that includes a visual representation of vending kiosk 206. As used herein, the "capture" of a camera image may refer to any obtaining, by mobile device 202, of data representative of a view of the camera in mobile device 202. The captured camera image may include a still-shot image captured by the camera or a frame included in video captured by the camera, which video may include real-time viewfinder mode imagery of the camera that is not stored to memory or stored imagery of the camera that is stored to memory. The captured camera image may frame vending kiosk 206 within the camera image such that the camera image includes a visual representation of vending kiosk 206. Examples of mobile devices 202 include, without limitation, mobile phones, smart phones, media player devices, table computers, e-book readers, personal-digital assistant devices, gaming devices, and/or any other suitable mobile computing devices.

A mobile device 202 may be configured for use by a user 204 associated with (e.g., operating) the mobile device 202 to access the vending service provided by system 100. For example, the mobile device 202 may include an installed mobile application configured to execute on the mobile device to provide one or more of the user interfaces described herein. As another example, the mobile device 202 may include a web browser or other client application configured to access one or more user interfaces provided by server system 208. Accordingly, the user 204 may utilize the mobile device 202 to access one or more user interfaces provided by user interface facility 106 as part of the vending service and to use the user interfaces to interact with the vending service (e.g., by interacting with a vending kiosk as part of the vending service). For example, a user 204 may interact with the vending service (e.g., with server system 208 and/or vending kiosk 206) using his or her mobile device 202 as he or she waits in line for a turn to physically approach vending kiosk 206.

Figure 3:
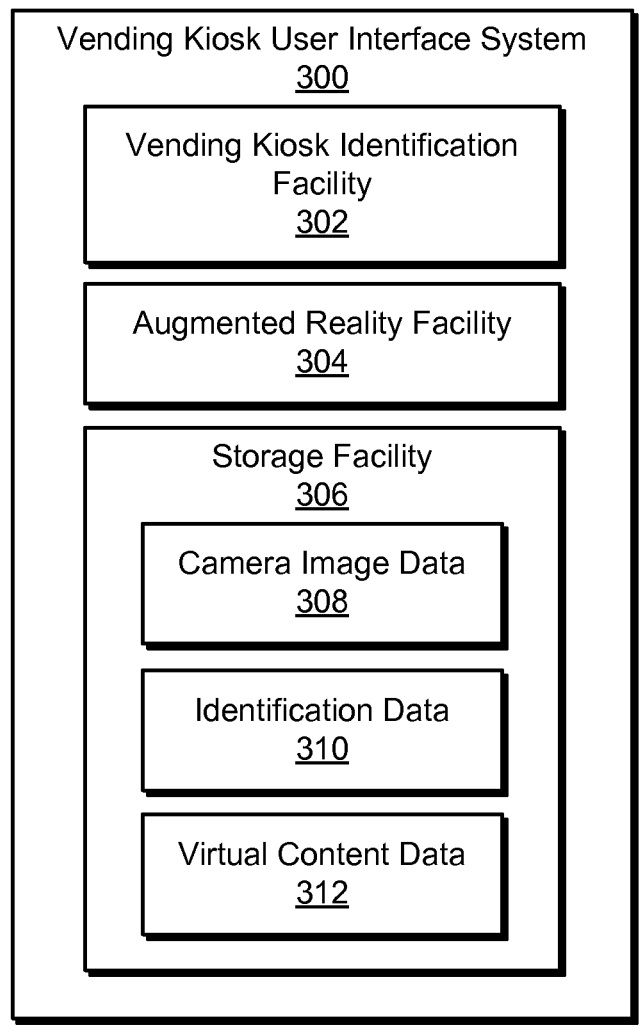
FIG. 3 illustrates an exemplary vending kiosk user interface system according to principles described herein.

To this end, user interface facility 106 may implement a vending kiosk user interface system configured to perform one or more of the user interface operations described herein. FIG. 3 illustrates an exemplary vending kiosk user interface system 300 ("system 300") that may be implemented by user interface facility 106. As shown, system 300 may include, without limitation, a vending kiosk identification facility 302 ("identification facility 302"), an augmented reality facility 304, and a storage facility 306 selectively and communicatively coupled to one another. The facilities may be communicatively coupled one to another by any suitable communication technologies. While facilities 302-306 are shown to be separate facilities in FIG. 3, any of facilities 302-306 may be combined into fewer facilities, such as into a single facility, or divided into more facilities as may serve a particular implementation.

Storage facility 306 may be configured to store data generated and/or used by identification facility 302 and/or augmented reality facility 304, such as camera image data 308, identification data 310, and virtual content data 312, examples of which are described herein. Storage facility 306 may maintain additional or alternative data as may serve a particular implementation.

Identification facility 302 may be configured to receive a camera image captured by a mobile device. Identification facility 302 may receive data representative of the camera image in any suitable way and/or format. In some examples, identification facility 302 may receive the camera image in real-time or near real-time as the camera image is captured by a camera integrated in the mobile device. The camera image may comprise a still-shot photo or an image included in a continuous video stream (e.g., a frame of video captured by a video camera integrated in the mobile device). Data representative of the camera image may be stored as camera image data 308 in storage facility 306.

The camera image may include camera image content, which may include a visual representation of a vending kiosk located within a vicinity of the mobile device used to capture the camera image. For example, a user of the mobile device may point a camera lens integrated in the mobile device at the vending kiosk that is located within line-of-sight of the camera lens and direct the mobile device to capture a camera image. The captured camera image may be displayed on a display screen of the mobile device.

Figure 4:
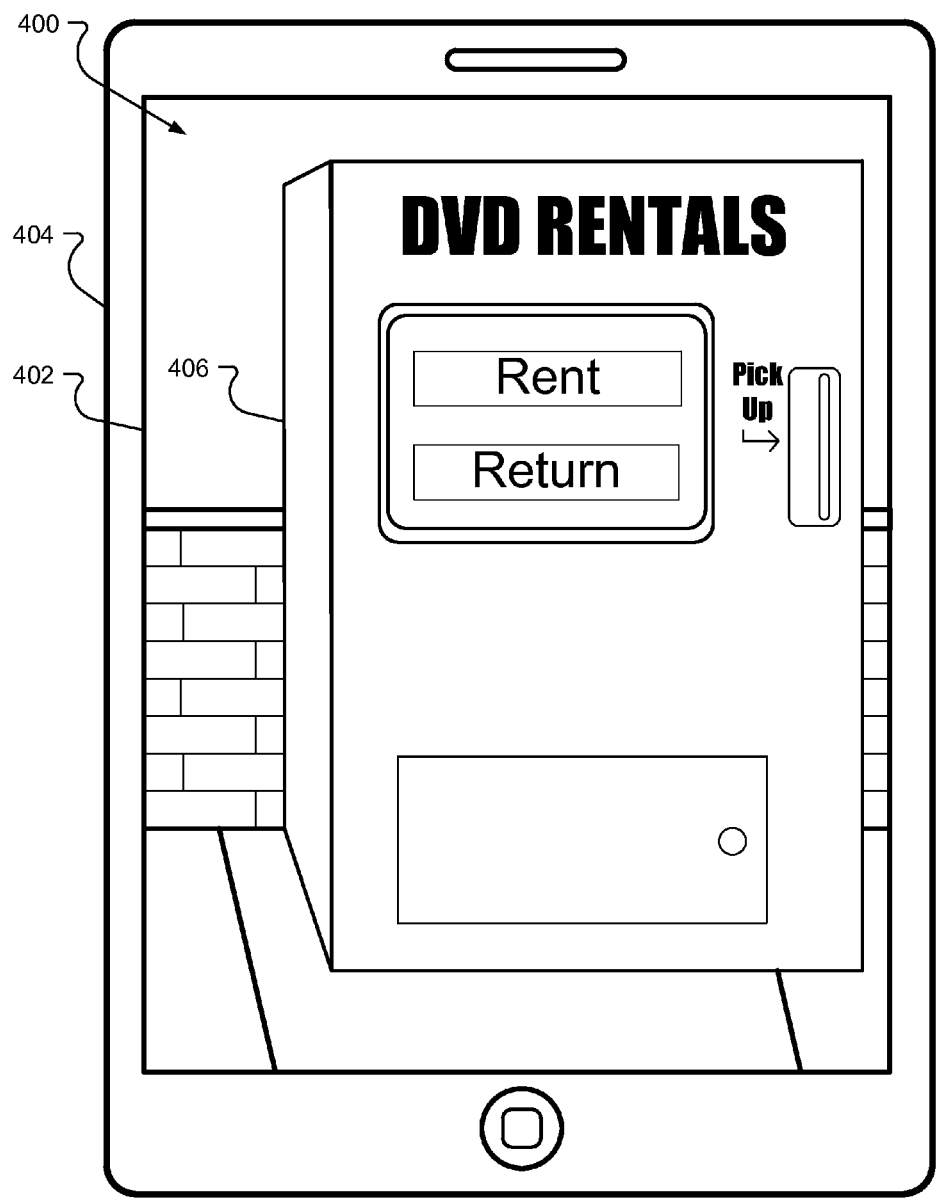
FIG. 4 illustrates an exemplary camera image generated by a mobile device, the camera image including a visual representation of a vending kiosk according to principles described herein.

To illustrate, FIG. 4 shows content of a camera image 400 displayed on a display screen 402 of a mobile device 404. As shown, the camera image 400 includes visual representations of real-world objects. In the illustrated example, the camera image 400 includes a visual representation 406 of a vending kiosk and visual representations of objects (e.g., a sidewalk, a brick wall, a building window, etc.) that are included in the real-world environment of the vending kiosk.

Identification facility 302 may be configured to detect a visual representation of a vending kiosk within a camera image. The detection may be performed in any suitable way. For example, identification facility 302 may be configured to analyze data representative of the camera image and, based on the analysis, detect one or more attributes of content of the camera image that have been predefined to be indicative of the presence of a visual representation of a vending kiosk within the camera image.

The predefined attributes of the camera image may represent physical features of a vending kiosk. For instance, a vending kiosk associated with a vending service may have a particular shape, color, logo, and/or other physical features that may be represented in the camera image by certain attributes of the camera image. As an example, a vending kiosk may be red in color, which may be represented in the camera image by one or more attributes (e.g., color values) of the camera image. As another example, a vending kiosk may have a distinct logo displayed on the front of the vending kiosk, which may be represented in the camera image by one or more attributes of the camera image.

Identification facility 302 may be configured to detect such attributes in the camera image, determine whether the set of attributes included in the camera image satisfy predefined matching criteria, and, if the criteria are satisfied by the set of attributes included in the camera image, detect that the camera image contains a visual representation of a vending kiosk.

In certain examples, the detecting of the visual representation of the vending kiosk in the camera image may include identification facility 302 determining a location of the visual representation of the vending kiosk and/or one or more features of the vending kiosk within the camera image. For example, identification facility 302 may determine image coordinates (e.g., pixel coordinates) of a set of pixels that visually represent the vending kiosk and/or one or more features of the vending kiosk in the camera image.

Figure 5:
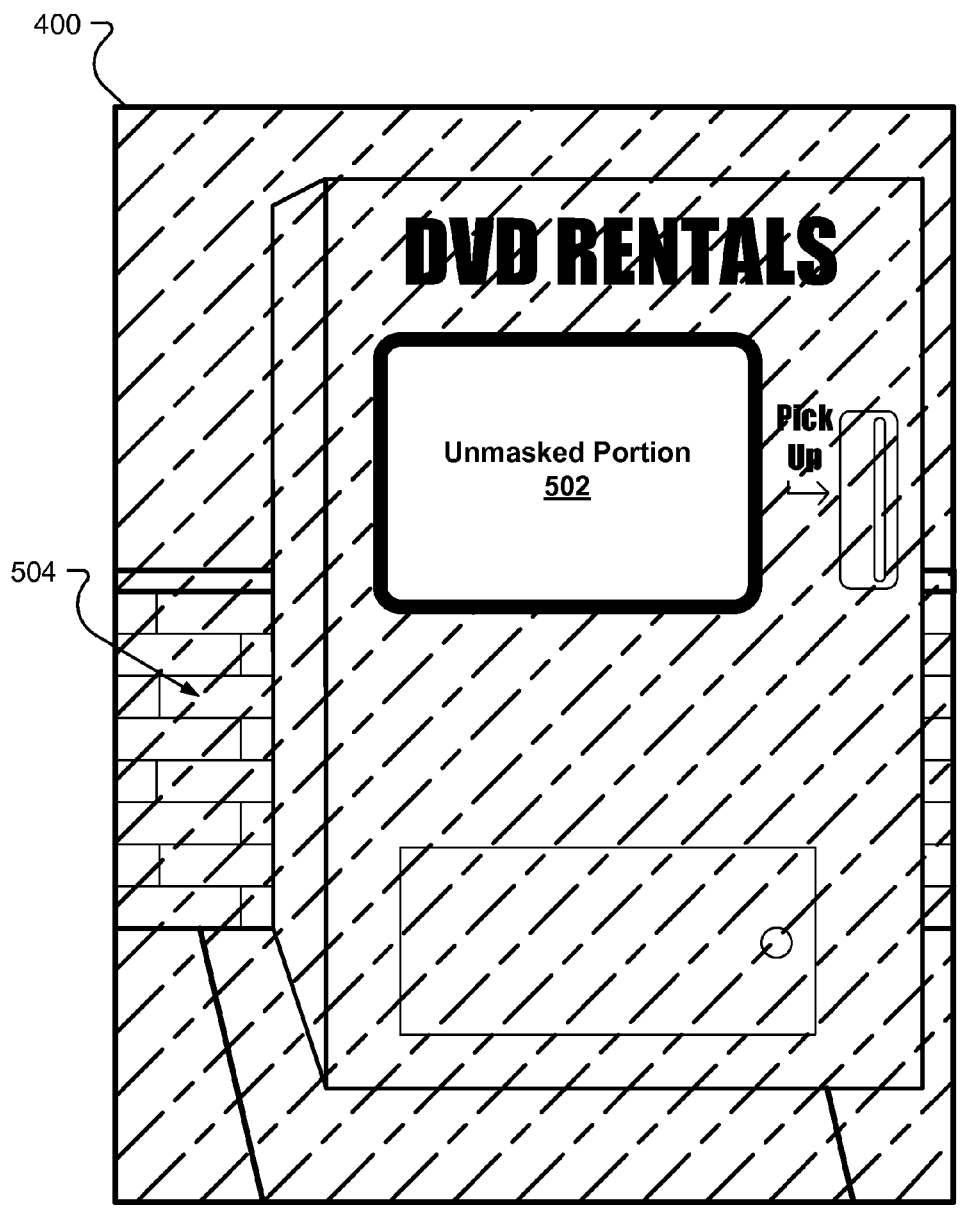
FIGS. 5-6 illustrate exemplary masked images comprising demarcations for masked and unmasked portions of the camera image of FIG. 4 according to principles described herein.
Figure 6:
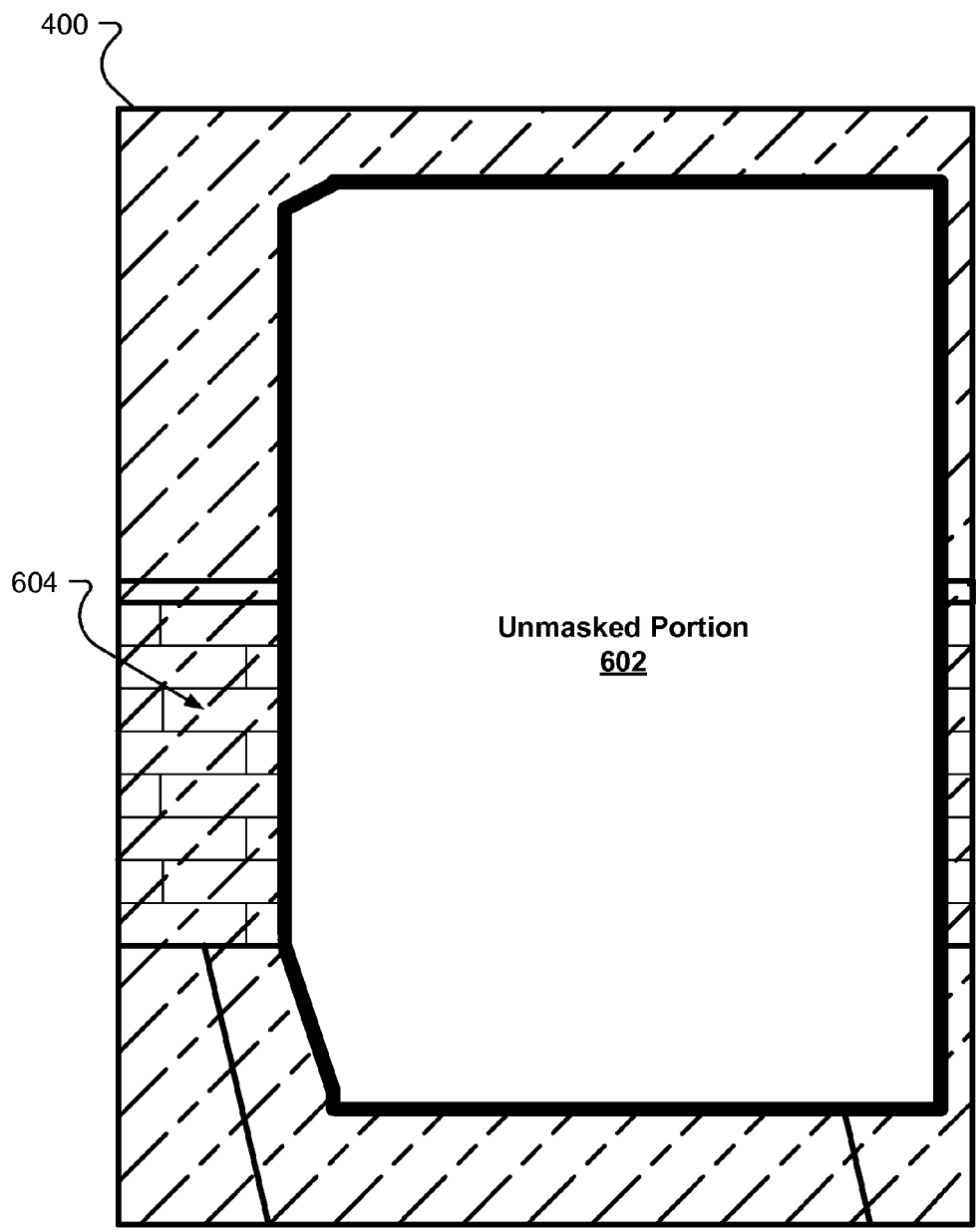

Identification facility 302 may mark the location of the visual representation in any suitable way. For example, identification facility 302 may mask and/or unmask portions of the camera image based on the location of the visual representation of the vending kiosk and/or one or more features of the vending kiosk within the camera image. FIG. 5 illustrates camera image 400 having an unmasked portion 502 that marks the location of a visual representation of a display screen feature of the vending kiosk within the camera image, and a masked portion 504, represented by diagonal dashed lines in FIG. 5, that marks the location of the visual representations of the remaining content of the camera image. FIG. 6 illustrates camera image 400 having different masked and unmasked portions, such as an unmasked portion 602 that marks the location of the visual representation of the vending kiosk within the camera image and a masked portion 604, represented by diagonal dashed lines in FIG. 6, that marks the location of the visual representations of the remaining content of the camera image.

Identification facility 302 may mark the location of a visual representation of a vending kiosk and/or one or more features of the vending kiosk for use by augmented reality facility 304 to determine a location for virtual content to be placed in an augmented reality image relative to content of the camera image, such as described herein. For example, virtual content may be placed within or otherwise relative to a masked or unmasked portion of the camera image to form an augmented reality image, such as described herein.

A visual representation of a vending kiosk in a camera image may visually represent any part and/or view of the vending kiosk, such as a full or partial front-view, side-view, or perspective-view of the vending kiosk as captured by a camera. Identification facility 302 may be configured to detect any such visual representation of a vending kiosk in a camera image.

In certain embodiments, identification facility 302 may be configured to identify a specific vending kiosk that is represented in a camera image. For example, a plurality of vending kiosks may be associated with the vending service provided by system 100, and kiosk management data 112 may specify information about the plurality of vending kiosks. Identification facility 302 may be configured to identify, from kiosk management data 112, a specific vending kiosk that is visually represented in the camera image.

The identification of the specific vending kiosk represented in the camera image may be performed in any suitable way. As an example, the vending kiosk may have a unique physical feature represented in the camera image. Identification facility 302 may be configured to identify the visual representation of the unique physical feature of the vending kiosk in the camera image and, from the visual representation of the unique physical feature, identify the specific vending kiosk visually represented in the camera image. For instance, the vending kiosk may display a unique identification number for the vending kiosk in a manner that allows the unique identification number to be captured and represented in a camera image that includes a visual representation of the vending kiosk.

As another example, identification facility 302 may be configured to use the current geographic location of the mobile phone that captured the camera image to identify the specific vending kiosk represented in the camera image. To illustrate, identification facility 302 may receive data representative of the current geographic location of the mobile device along with the camera image. The location data may be received as part of the camera image (e.g., as location tag data included in the camera image) or separate from the camera image.

Identification facility 302 may search kiosk management data 112, which may contain location data for vending kiosks associated with the vending service, and identify a vending kiosk having a geographic location that is within a predefined geographic vicinity of the current location of the mobile device that captured the camera image. Identification facility 302 may then select the identified vending kiosk as the specific vending kiosk represented in the camera image.

Identification facility 302 may identify the specific vending kiosk represented in the camera image for use by augmented reality facility 304 to select the virtual content to include in an augmented reality image, such as described herein. For example, virtual content specific to or otherwise associated with the specific vending kiosk (e.g., virtual content representative of the current inventory of the vending kiosk) may be selected for inclusion in an augmented reality image, such as described herein.

Data associated with general detection of a visual representation of a vending kiosk in a camera image and/or identification of the specific vending kiosk represented in the camera image may be stored as identification data 310 in storage facility 306. The identification data 310 may include any information about the visual representation of the vending kiosk and/or the vending kiosk. For example, the identification data 310 may include, without limitation, information about attributes of the visual representation of the vending kiosk in the camera image (e.g., size, dimensions, location, etc. of the visual representation) and/or information about the specific vending kiosk (e.g., the geographic location, an identifier such as a unique ID, etc. of the vending kiosk).

Augmented reality facility 304 may be configured to provide an augmented reality user interface configured to facilitate user interaction with the vending kiosk and/or a vending service associated with the vending kiosk. The augmented reality user interface may include one or more augmented reality images configured to facilitate user interaction with the vending kiosk and/or the vending service associated with the vending kiosk.

To this end, augmented reality facility 304 may be configured to generate an augmented reality image for display in an augmented reality GUI. Augmented reality facility 304 may generate the augmented reality image in response to or otherwise based on the detection, by identification facility 302, of a visual representation of a vending kiosk within a camera image captured by a mobile device. The generation of the augmented reality image may include augmented reality facility 304 selecting and adding virtual content to camera image content included in the camera image (e.g., by overlaying the virtual content over one or more portions of the camera image) to form the augmented reality image that includes a combination of camera image content included in the camera image and the virtual content.

The virtual content may include any content that may be added to a camera image to form an augmented reality image. In certain examples, the virtual content is associated with the vending service provided by system 100 and/or the vending kiosk represented in the camera image. For instance, the virtual content may be associated with (e.g., represent) inventory items of the vending service and/or the vending kiosk. As an example, the virtual content may include one or more virtual objects that visually represent inventory items of the vending service and/or the vending kiosk. As another example, the virtual content may include one or more virtual objects that visually represent a promotion for an inventory item of the vending service and/or the vending kiosk. Virtual content may be represented by virtual content data 312 stored in storage facility 306.

Augmented reality facility 304 may be configured to select, from a repository of virtual content (e.g., virtual content represented by virtual content data 312), specific virtual content to include in an augmented reality image. The selection may be made by augmented reality facility 304 based on any suitable criteria. Examples of such criteria include, without limitation, attributes of a visual representation of a vending kiosk in a camera image (e.g., size, location, etc. of the visual representation of the vending kiosk within the camera image), attributes of the specific vending kiosk represented in the camera image (e.g., geographic location, current inventory, etc. of the vending kiosk), advertising campaign settings, attributes of the mobile device that captured the camera image (e.g., display screen size, resolution, etc. of the mobile device), user profile information associated with the mobile device, user input to the mobile device (e.g., user interface navigational commands provided by a user), and any other suitable criteria.

To illustrate one example, where the specific vending kiosk represented in a camera image has been identified by identification facility 302, augmented reality facility 304 may identify the current inventory of the specific vending kiosk, such as by querying kiosk vending data 110 and/or kiosk management data 112 to determine the current inventory of the specific vending kiosk, and select virtual content for inclusion in an augmented reality image based on the current inventory of the specific vending kiosk. For instance, the virtual content may represent at least part of the current inventory of the specific vending kiosk and/or a promotion for an inventory item (e.g., an offer for discounted and/or reserved access to the inventory item) included in the current inventory of the specific vending kiosk.

Virtual content may be similarly selected based at least in part on a general inventory of the vending service. For instance, virtual content may be selected that represents at least part of the general inventory of the vending service and/or a promotion for an inventory item (e.g., an offer for discounted and/or reserved access to the inventory item)

included in the general inventory of the vending service (an inventory item currently offered or scheduled to be offered by the vending service).

Augmented reality facility 304 may be configured to include selected virtual content in an augmented reality image by combining the selected virtual content with camera image content of a camera image in any suitable way. For example, augmented reality facility 304 may add virtual content to a camera image, such as by overlaying the virtual content over a portion of the camera image.

To this end, augmented reality facility 304 may select a portion of a camera image over which virtual content will be overlaid. The selection may be based on any suitable criteria. In certain examples, augmented reality facility 304 may select a portion of a camera image based on at least one attribute of a visual representation of a vending kiosk in the camera image, such as the size, dimensions, location, etc. of the visual representation of the vending kiosk in the camera image.

In certain implementations, augmented reality facility 304 may access and use camera image data 308 and/or identification data 310 to select a portion of the camera image. For example, from identification data 310, augmented reality facility 304 may identify masked or unmasked portions of the camera image and select a portion of the camera image to be overlaid based on the masked or unmasked portions of the camera image. The selection may include selecting a masked or unmasked portion of the camera image to be the portion over which virtual content is to be overlaid. Additionally or alternatively, the selection may include selecting a portion of the camera image over which virtual content is to be overlaid relative in position to the masked or unmasked portion of the camera image. For example, augmented reality facility 304 may select a virtual content location that is immediately adjacent to and/or overlays a portion or all of a visual representation of a vending kiosk in a camera image.

Exemplary views of augmented reality images that may be generated by augmented reality facility 304 for display in an augmented reality user interface will now be described.

Figure 7:
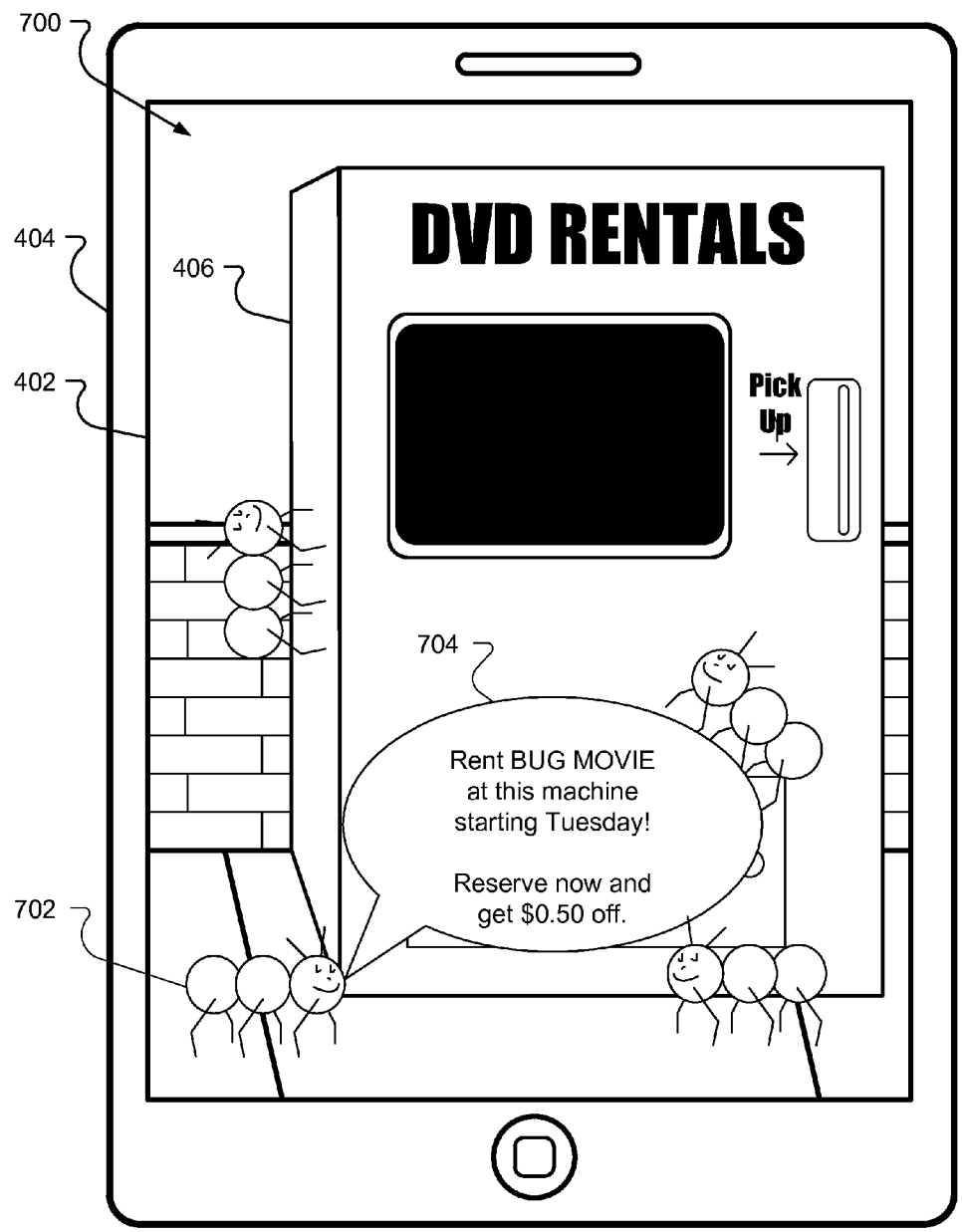
FIGS. 7-9 illustrate exemplary views of augmented reality images displayed on a mobile device according to principles described herein.

FIG. 7 illustrates an exemplary view of an augmented reality image 700 displayed on a display screen 402 of a mobile device 404. The augmented reality image 700 includes a combination of virtual content associated with a vending service (e.g., the vending service provided by system 100) and camera image content of a camera image captured by a mobile device that includes a visual representation 406 of a vending kiosk. In the illustrated example, the virtual content comprises virtual objects depicting cartoon bugs positioned relative to the virtual representation 406 of the vending kiosk. For example, virtual object 702 visually depicts a cartoon bug positioned relative to the visual representation 406 of the vending kiosk in the camera image (e.g., standing on a sidewalk next to the vending kiosk).

The virtual content may be configured to provide a message to a user of the mobile device 404. For example, the virtual content may include a virtual object 704 in the form of a callout that includes text of a message. In the illustrated example, virtual object 704 includes a notification that a movie titled "Bug Movie" will be available at the vending kiosk represented in the camera image starting on a particular day. The virtual object 704 further includes a promotion for the movie that offers discounted and/or reserved access to the movie. In particular, the promotion indicates that if the user reserves the movie now, the user will receive discounted access to the movie.

The virtual content included in augmented reality image 700 may be configured to facilitate user interaction with the vending kiosk represented in the camera image and/or the vending service associated with the vending kiosk. For example, the virtual content shown in FIG. 7 may prompt the user of the mobile device 404 to provide input to the mobile device 404 to request information about the movie, the promotion for the movie, and/or accessing the movie. In certain examples, the virtual content may include an option that may be selected by the user of the mobile device 404 to cause one or more other GUI views associated with the vending service and/or the vending kiosk to be displayed by the mobile device 404. For example, a user interface configured to facilitate access to (e.g., reservation, purchase, or lease of) the movie being promoted by the virtual content may be provided to the user in response to user selection of an option included in the virtual content. For example, virtual object 704 may be selected by the user to trigger a launch of such a user interface. In this or a similar manner, augmented reality image 700 may function as a gateway to one or more user interfaces associated with the vending service and/or the vending kiosk represented in the camera image. Such user interfaces may include augmented reality user interfaces and/or fully virtual user interfaces.

Figure 8:
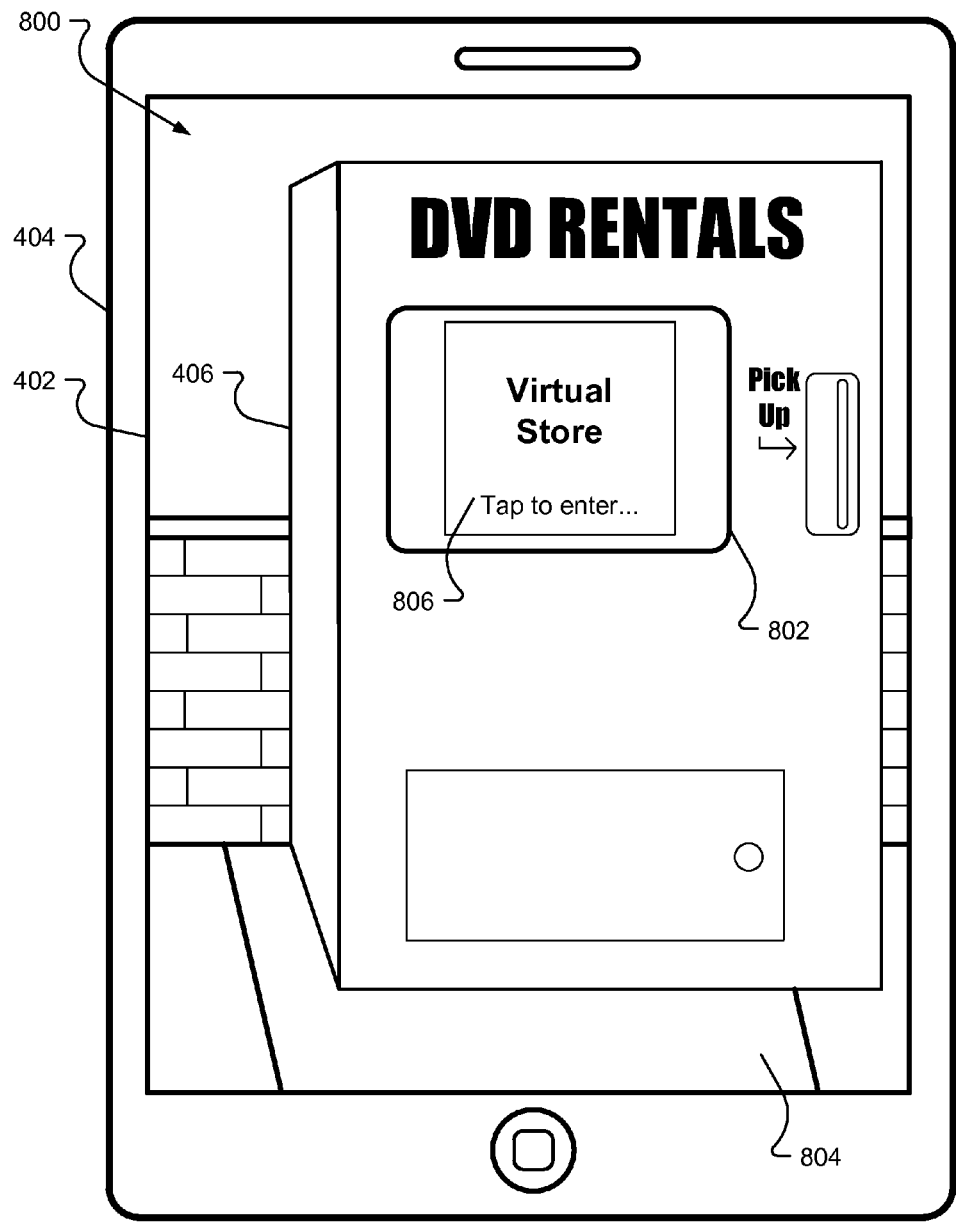

FIG. 8 illustrates an exemplary view of an augmented reality image 800 that includes a combination of virtual content 802 associated with a vending service (e.g., the vending service provided by system 100) and camera image content 804 of a camera image captured by a mobile device. Within augmented reality image 800, virtual content 802 may be displayed within the rectangular area labeled virtual content 802, and camera image content 804 may include the remaining content included in augmented reality image 800. In the illustrated example, the location of the virtual content 802 corresponds to a visual representation of a display screen integrated in the vending kiosk in the camera image, and the visual representation 406 of the vending kiosk that surrounds virtual content 802 is part of the camera image content of the camera image. Augmented reality facility 304 may select this location for the virtual content 802 in any suitable way, including by identifying the location as corresponding to the unmasked portion 502 of the camera image marked by identification facility 302.

In the example illustrated in FIG. 8, the virtual content 802 represents a virtual entryway 806 to a virtual store offering access to vending kiosk inventory items. A user may provide input to select an option to enter the virtual store (e.g., by touching entryway 806 on the display screen 402 of the mobile device 404 or by providing other suitable input). In response to this input, augmented reality facility 304 may provide one or more GUI views associated with the vending service and/or the vending kiosk to be displayed by the mobile device 404 and configured to facilitate user interaction with the vending kiosk and/or vending service. For example, one or more GUI views configured to facilitate user discovery of and access to (e.g., reservation, purchase, or lease of) vending kiosk inventory may be provided to the user in response to the user selecting to enter the virtual store by way of entryway 806. In certain examples, a GUI view of a virtual store associated with the vending service, such as the GUI view that includes the augmented reality image shown in FIG. 9, may be displayed in response to a user selection of entryway 806.

Figure 9:
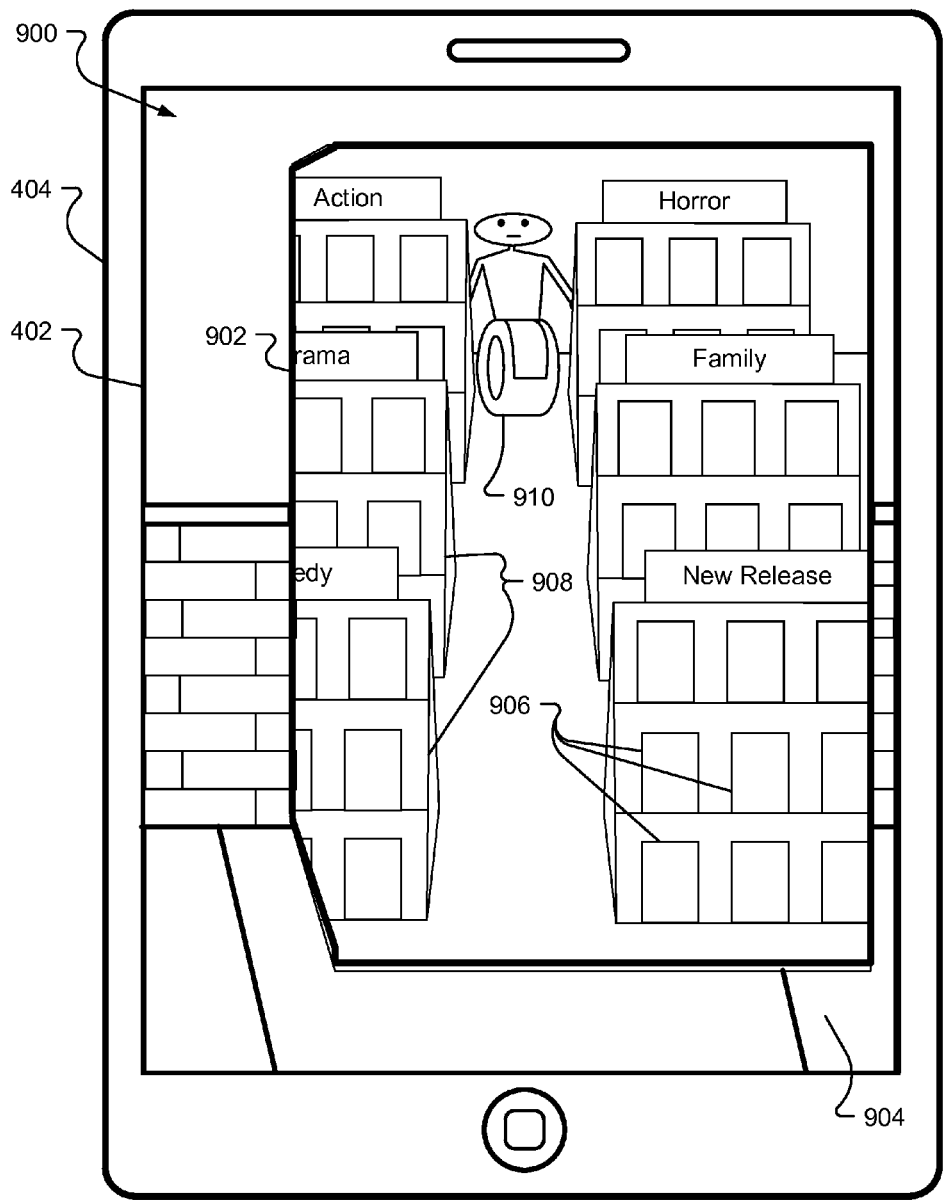

FIG. 9 illustrates an exemplary view of an augmented reality image 900 that includes a combination of virtual content 902 visually representing a virtual store associated with a vending service (e.g., the vending service provided by system 100) and camera image content 904 of the camera image captured by a mobile device. Within augmented reality image 900, the virtual content 902 representing the virtual store may be displayed within the area labeled virtual content 902, and camera image content 904 may include the remaining content included in augmented reality image 900. In the illustrated example, the location of the virtual content 902 corresponds to the visual representation 406 of the vending kiosk in the camera image. Augmented reality facility 304 may select this location for placement of the virtual content 902 in any suitable way, including by identifying the location as corresponding to the unmasked portion 602 of the camera image marked by identification facility 302.

As shown in FIG. 9, the virtual content 902 includes a visual representation of a virtual store that contains one or more virtual objects 906 representing items offered as part of the vending service. For example, virtual objects 906 may represent media items such as DVD titles, Blu-Ray titles, and/or video game titles offered by a media vending service. The items represented by the virtual objects 906 may be included in the general inventory of the vending service and/or in the current inventory of the vending kiosk represented in the camera image, such as described herein.

As further shown in FIG. 9, virtual objects 906 may be arranged on virtual display fixtures 908. Together, the virtual objects 906 and virtual display fixtures 908 may be arranged to provide a visual representation of an interior of a virtual store premises such as a virtual media rental store premises. In some examples, the virtual objects 906 and virtual display fixtures 908 included in virtual content 902 may be arranged to visually represent a three-dimensional interior of a virtual store premises, which may provide a user with a familiarity of physically being in and/or moving about a real-world brick-and-mortar store premises.

Augmented reality facility 304 may be configured to receive user input and modify the virtual content 902 included in augmented reality image 900 in order to change the viewpoint from which the virtual store is viewed based on the user input. This may allow a user of mobile device 404 to provide input to change the viewpoint from which the virtual store is displayed by the mobile device 404. Accordingly, augmented reality facility 304 may provide the user with an experience that virtualizes what a user would experience when physically moving about a real-world brick-and-mortar store premises.

Any suitable user input may be used as commands to change the viewpoint of the virtual store. For example, the user may physically change the orientation of the mobile device 404, such as by tilting, panning, and/or pitching the mobile device, to cause the viewpoint from which the virtual store is viewed to change. Accordingly, the user is provided with an adjustable first-person view of the virtual store displayed on the display screen 402 of the mobile device 404.

Figure 10:
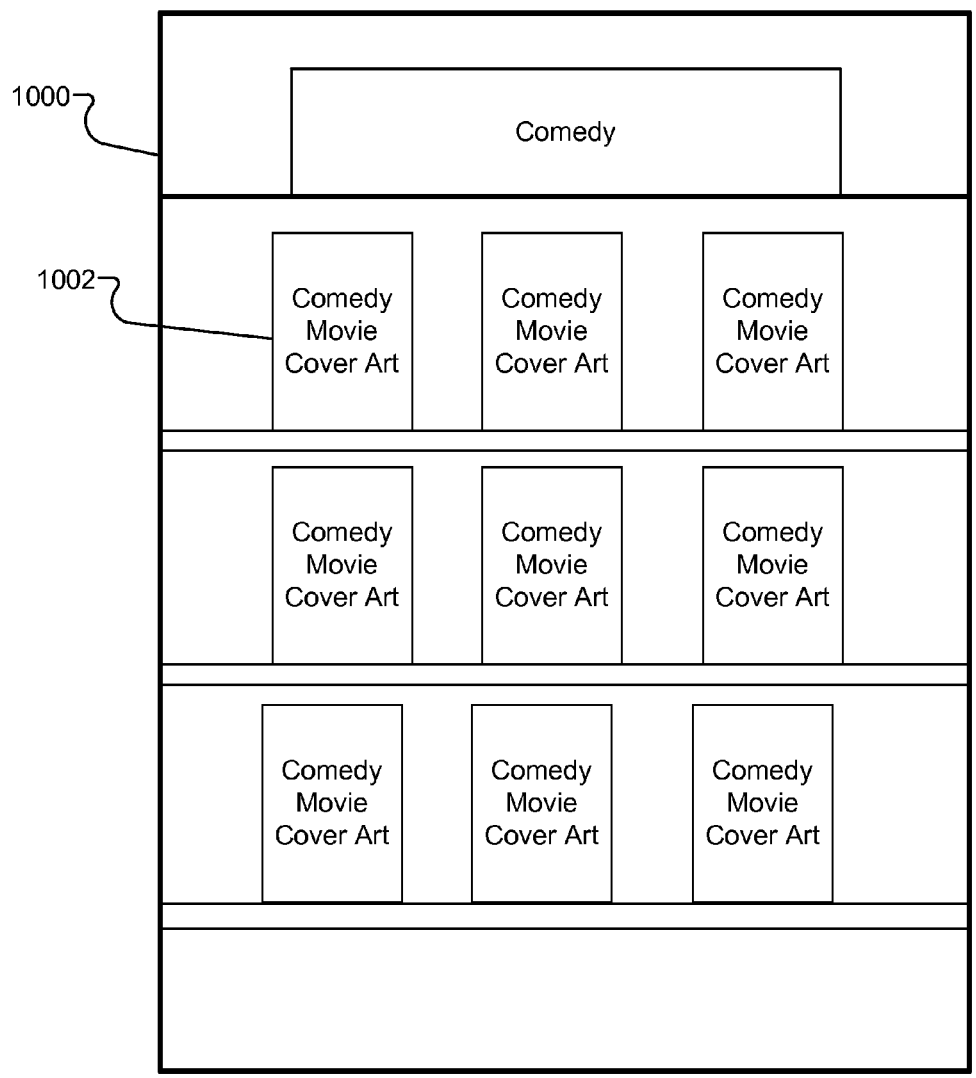
FIGS. 10-11 illustrate exemplary virtual content associated with a virtual store according to principles described herein.

FIG. 10 illustrates virtual content 1000 that visually represents a front-view of a virtual display fixture 908 of the virtual store. In certain examples, virtual content 1000 may be included in a GUI view, such as within an augmented reality image of a GUI view, in response to a user navigating within the virtual store represented in FIG. 9 to a particular virtual display fixture 908, which may trigger the display of the virtual content 1000 shown in FIG. 10. For example, augmented reality facility 304 may replace virtual content 902 with virtual content 1000 in response to user input that changes the viewpoint of the virtual store from the viewpoint shown in FIG. 9 to a front-view perspective of a virtual display fixture 908. For example, the user may provide input to navigate the first-person viewpoint of the virtual store to a position immediately in front of a virtual display fixture 908 labeled "comedy," and the virtual content included in the augmented reality image 900 may be updated accordingly to depict the change in the first-person viewpoint of the virtual store.

The user may interact with virtual content 1000 to discover and/or access vending kiosk inventory. For example, the virtual content 1000 may include user selectable virtual objects representing inventory items. For instance, virtual object 1002 may represent an inventory item such as a movie, and the user may provide input to select the virtual object 1002 in order to access the movie, additional information about the movie, and/or one or more options related to the movie.

Returning to FIG. 9, virtual content 902 may further include a visual representation of a virtual assistant 910 associated with the virtual store. If a user of the mobile device 404 wants to interact with the virtual assistant 910, the user may provide input to navigate the first-person viewpoint of the virtual store to a position immediately in front of the virtual assistant 910. In response, the virtual content 902 included in the augmented reality image 900 may be updated accordingly to depict the change in the first-person viewpoint of the virtual store. When the viewpoint reaches the position immediately in front of the virtual assistant 910, virtual content that visually represents a front-view of the virtual assistant 910 may be displayed in the augmented reality image 900 in place of virtual content 902.

Figure 11:
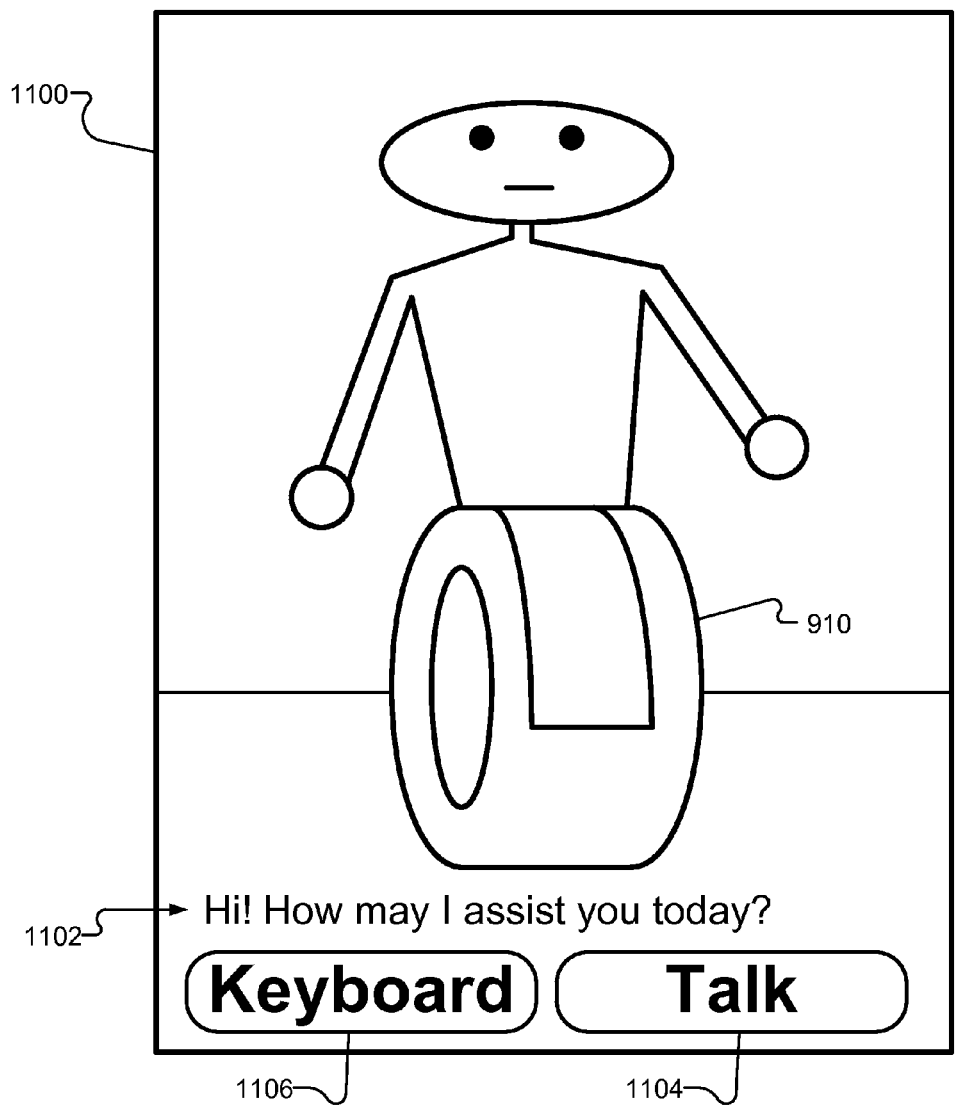

FIG. 11 illustrates virtual content 1100 that visually represents a front-view of the virtual assistant 910 of the virtual store. When the front-view of the virtual assistant 910 is displayed, the user of the mobile device 404 may interact with the virtual assistant 910. For example, the virtual assistant 910 may receive commands from the user of the mobile device 404 and respond to the commands to assist the user in interacting with the virtual store. For instance, the virtual assistant 910 may provide information relating to an item represented in the virtual store, offer a recommendation relating to an item represented in the virtual store (e.g., by recommending a movie to the user), and/or provide instruction relating to a feature of the virtual store. The virtual assistant 910 may communicate with the user in any suitable way, such as by audible dialogue output and/or display of user-readable messages on the display screen 402 of the mobile device 404.

Commands may be provided to the virtual assistant 910 in any suitable way. For example, user voice input and/or keyboard input may be used by the user to provide commands to the virtual assistant 910. In FIG. 11, the virtual content 1100 includes an introductory message 1102 from the virtual assistant 910 offering to assist the user, as well as an option 1104 configured to be selected by the user to use voice input to provide commands to the virtual assistant 910, and an option 1106 configured to be selected by the user to use a keyboard to provide commands to the virtual assistant 910.

In any of the ways described herein, the user of the mobile device 404 may interact with the virtual store to discover and access vending kiosk inventory items that are of interest to the user. The user may provide input to access (e.g., purchase, lease, and/or reserve) such items. To this end, augmented reality facility 304 may be configured to provide virtual content that includes a visual representation of a virtual shopping cart with which the user may interact to access the items.

Figure 12:
FIG. 12 illustrates exemplary virtual content associated with a virtual store displayed in a fully virtual user interface view according to principles described herein.

FIG. 12 illustrates virtual content 1200 that visually represents a virtual shopping cart associated with the virtual store. As shown, the visual content 1200 visually represents items included in the shopping cart and the price to access the items. The virtual content 1200 may further include an option 1202 configured to be selected by the user to reserve the items for pickup at a vending kiosk (e.g., at the vending kiosk represented in the camera image) and an option 1204 configured to be selected by the user to purchase the items and check out.

In certain examples, after a user selects option 1202 or option 1204, the items in the cart will be available for pickup by the user at a vending kiosk associated with the vending service, such as at the vending kiosk represented in the camera image. If the user chooses to reserve the items for pickup by selecting option 1202, the user may pay for access to the items at the vending kiosk (e.g., using a user interface integrated in the vending kiosk when the user reaches the front of a line to use the vending kiosk). If the user chooses to pay and checkout by selecting option 1204, the user may pay using the mobile device 404 and simply pickup the items at the vending kiosk.

Augmented reality facility 304 may direct the mobile device that captured the camera image to display an augmented reality image generated by augmented reality facility 304 in an augmented reality GUI view. This may be performed in any suitable way, such as by augmented reality facility 304 directing user interface facility 106 to direct the mobile device to display a particular augmented reality GUI view.

The examples described above are illustrative only. Any other virtual content associated with the vending service may be included in an augmented reality image generated by augmented reality facility 304 in other examples. For example, an alternative virtual store such as a two-dimensional virtual store may be represented by virtual content. Such a two-dimensional virtual store may allow the user of the mobile device 404 to discover and access vending kiosk inventory items, such as by providing input to select virtual objects representing the items without animating three-dimensional movement of the first-person viewpoint of the virtual store.

As another example, in certain embodiments, the contents of a virtual store may be customizable by the user of the mobile device 404. This may allow the user to include specific sections in and/or omit specific sections from the virtual store. For instance, a user may add a "favorites" section and remove a "horror" section from the virtual store. Accordingly, when virtual content representing the virtual store is displayed in a GUI view, the contents of the virtual store may be arranged in accordance with the customization directed by the user.

Figure 13:
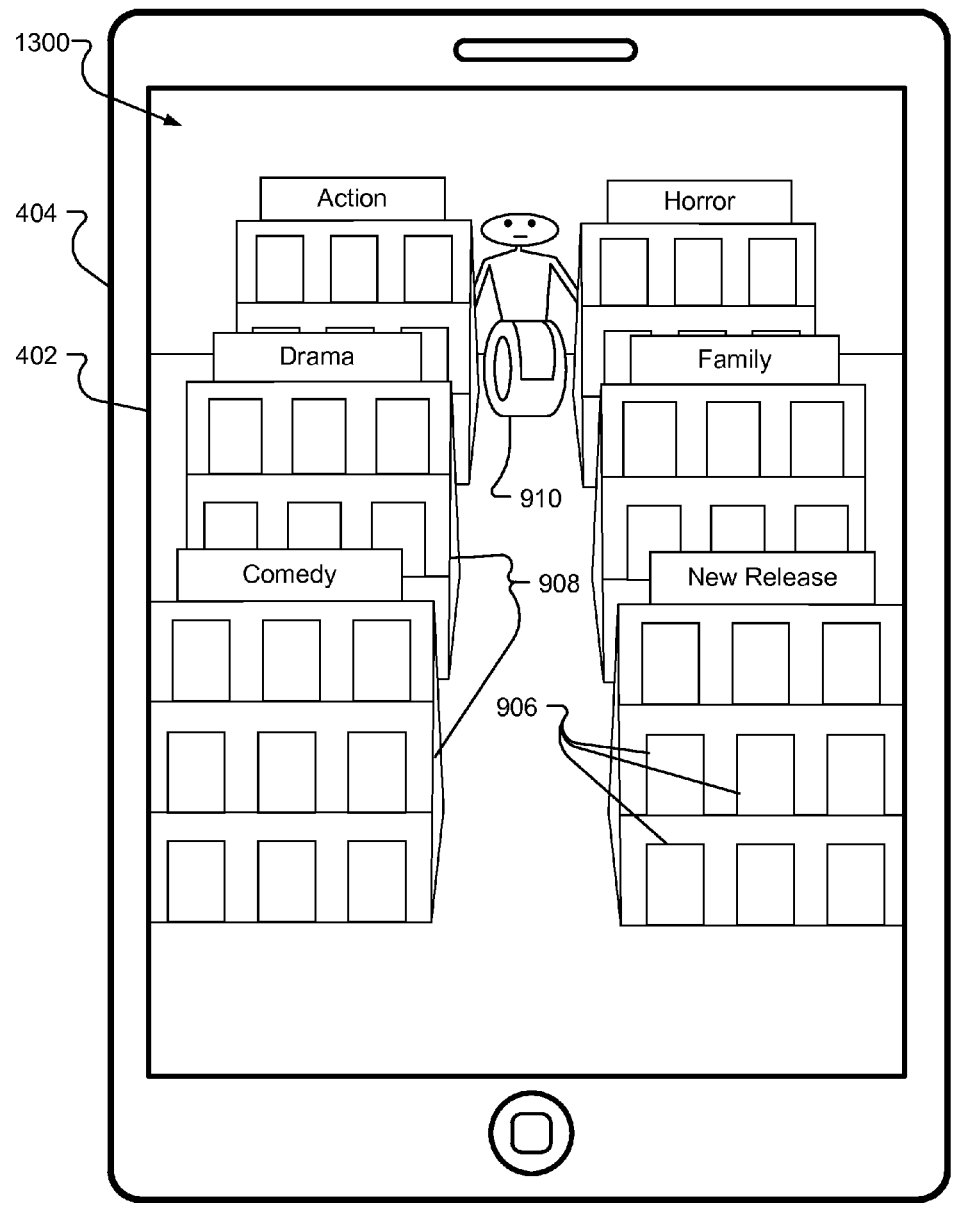
FIG. 13 illustrates exemplary virtual content for a virtual shopping cart according to principles described herein.

In one or more the examples described herein, virtual content is included in combination with camera image content to form an augmented reality image that may be displayed in an augmented reality GUI view. In certain alternative examples, virtual content illustrated herein may be displayed in a fully virtual GUI view rather than in an augmented reality GUI view. Unlike an augmented reality GUI view, real-world camera image content is not included in a fully virtual GUI view. To illustrate, FIG. 13 shows a fully virtual GUI view 1300 displayed on the display screen 402 of the mobile device 404. As shown, GUI view 1300 includes virtual content representative of the same virtual store represented by the virtual content 902 shown in FIG. 9. A user interface may be configured to transition from displaying an augmented reality GUI view to a fully virtual GUI view and vice versa at any suitable time and/or in response to any suitable event or input to the mobile device 404.

In a user interface based interaction between a user and a vending service, an initial generation of an augmented reality image may be based on a camera image captured by a mobile device and a detection of a visual representation of a vending kiosk associated with the vending service in the camera image, such as described herein. To capture the camera image, the user of the mobile device may point a camera lens integrated in the mobile device at the vending kiosk to frame the vending kiosk within the camera image. However, it may be undesirable to the user to continue to hold the mobile device in such a position throughout an interaction with the vending service. Accordingly, in certain embodiments, augmented reality facility 304 may be configured to operate such that the user is not required to continue to hold the mobile device such that the vending kiosk remains framed within view of the camera lens. This may be accomplished in any suitable way.

As an example, augmented reality facility 304 may be configured to use an initial camera image to generate an initial augmented reality image that contains a combination of camera image content included in the camera image and virtual content associated with the vending service. Subsequently, as a user interface based interaction session continues, augmented reality facility 304 may continue to use the initial camera image to generate one or more other augmented reality images that contain combinations of the same camera image content and other virtual content. Accordingly, the user does not have to continue to acquire camera images of the vending kiosk, and augmented reality facility 304 may conserve resources by not having to update the camera image content and/or reposition, resize, etc. the virtual content based on updates to the camera image content.

As another example, augmented reality facility 304 may transition from providing an augmented reality GUI view to providing a fully virtual GUI view at any point in a user interface based interaction session between a user of a mobile device and the vending service. In some examples, augmented reality facility 304 may detect that the mobile device is no longer capturing a camera image that includes a visual representation of a vending kiosk and, in response, transition to a fully virtual GUI view of virtual content associated with the vending service. In other examples, augmented reality facility 304 may detect user input requesting a fully virtual GUI view of virtual content and, in response, transition to a fully virtual GUI view of virtual content associated with the vending service. This may provide more screen area for use to represent virtual content.

In certain examples, the providing of an augmented reality user interface may be triggered by proximity of a mobile device to a vending kiosk associated with a vending service. For example, identification facility 302 may be configured to detect that a mobile device is located within the predefined geographic vicinity of a vending kiosk (e.g., as may be the case when a user of the mobile device is waiting in a line to use the vending kiosk). The detecting may be accomplished in any suitable way, such as by comparing location data of the mobile device with location data of one or more vending kiosks.

Figure 14:
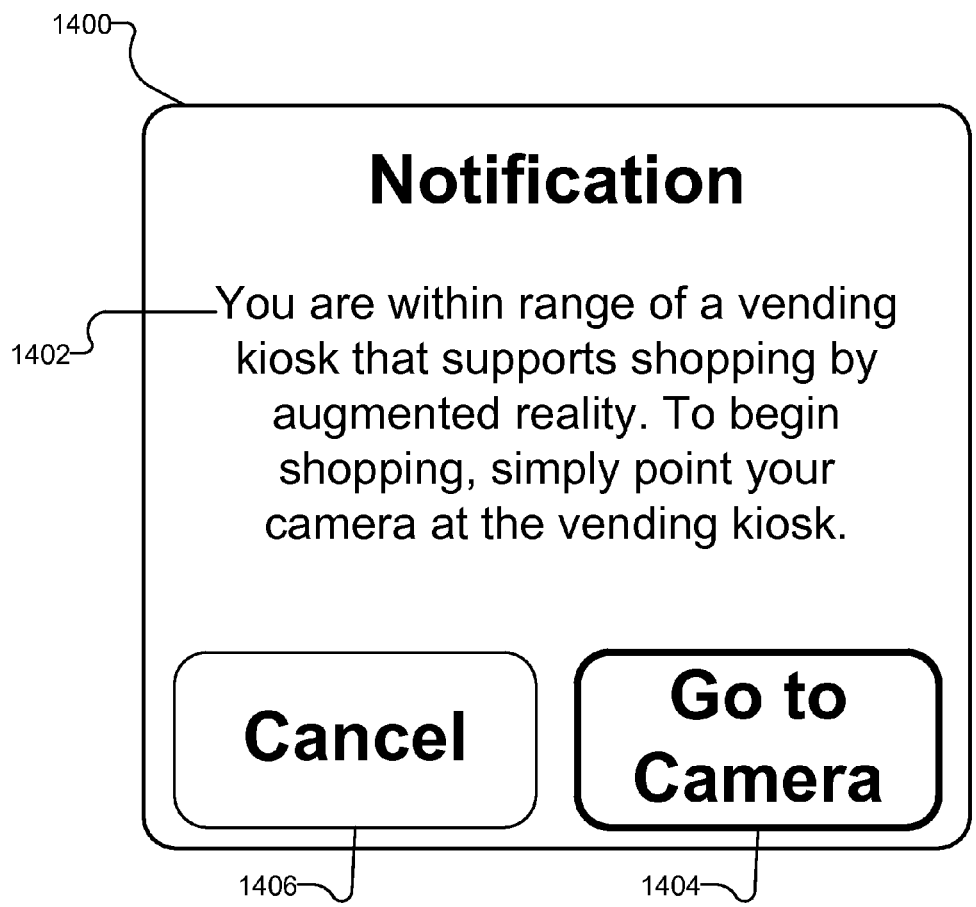
FIG. 14 illustrates an example of a notification message that may be presented to a user to indicate that an augmented reality is available according to principles described herein.

In response to the detection that the mobile device is located within the predefined geographic vicinity of the vending kiosk, identification facility 302 may provide a notification message configured to notify the user of the mobile device that an augmented reality user interface associated with the vending kiosk and/or a vending service associated with the vending kiosk is available to the user. To illustrate, FIG. 14 shows an exemplary notification message 1400 that may be provided to and displayed by the mobile device. As shown, message 1400 may include text 1402 that notifies the user that he or she is within range of a vending kiosk that supports shopping by augmented reality. In some examples, text 1402 may also instruct the user regarding how to access the augmented reality. In the illustrated example, text 1402 instructs the user to point a camera of the mobile device at the vending kiosk. As further shown, message 1400 may include an option 1404 configured to be selected by the user to launch a camera application installed on the mobile device such that the user may use the camera to capture a camera image of the vending kiosk. Message 1400 may also include an option 1406 configured to be selected by the user to close the message 1400 and not access the augmented reality associated with the vending service and/or the vending kiosk.

In response to a user selection of option 1404, identification facility 302 may detect a user request to access an augmented reality user interface. In response, identification facility 302 may prepare to receive a camera image captured by the mobile device. Additionally, in some examples, identification facility 302 may provide further instruction to the user as to how to access the augmented reality user interface.

The user may then use a camera in the mobile device to capture a camera image that includes a visual representation of the vending kiosk. Identification facility 302 may receive data representative of the camera image captured by the mobile device and detect the visual representation of the vending kiosk within the camera image, such as described herein. In response, augmented reality facility 304 may generate an augmented reality image that includes a combination of camera image content included in the camera image and virtual content associated with the vending service and direct the mobile device to display the augmented reality image in an augmented reality GUI view, such as described herein.

In any of the ways described herein, a vending-kiosk-based augmented reality image and/or a GUI view that includes the augmented reality image may function as a gateway to one or more user interfaces through which a user of a mobile device located within a vicinity of a vending kiosk may interact with the vending kiosk and/or a vending service associated with the vending kiosk. For example, a GUI view including a vending-kiosk-based augmented reality image may be generated and displayed on a display screen of the mobile device, such as described herein. A user may interact with the virtual content included in the augmented reality image and, in response, one or more other GUI views may be generated and displayed on the display screen of the mobile device for use by the user of the mobile device to interact with the vending kiosk and/or a vending service associated with the vending kiosk. The one or more other GUI views may include fully virtual GUI views associated with the vending service and/or one or more additional augmented reality GUI views associated with the vending service.

Figure 15:
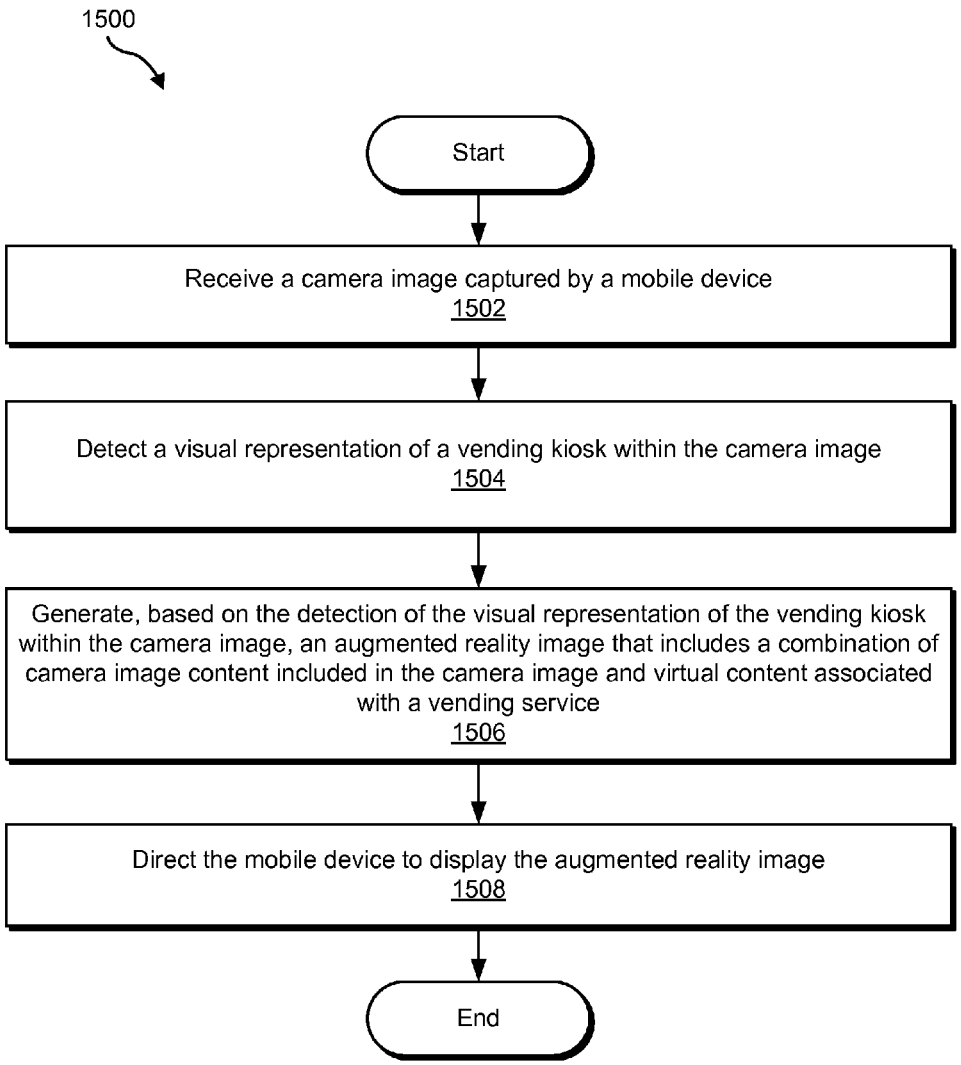
FIGS. 15-17 illustrate exemplary vending kiosk user interface methods according to principles described herein.

FIG. 15 illustrates an exemplary vending kiosk user interface method 1500 according to principles described herein. While FIG. 15 illustrates exemplary steps according to certain embodiments, other embodiments may omit, add to, reorder, combine, and/or modify any of the steps shown in FIG. 15. In certain embodiments, one or more of the steps shown in FIG. 15 may be performed by system 100, system 300, and/or one or more components or implementations of system 100 and/or system 300.

In step 1502, a vending kiosk user interface system receives a camera image captured by a mobile device. Step 1502 may be performed in any of the ways described herein.

In step 1504, the system detects a visual representation of a vending kiosk within the camera image. Step 1504 may be performed in any of the ways described herein.

In step 1506, the system generates, based on the detecting of the visual representation of the vending kiosk within the camera image, an augmented reality image that includes a combination of camera image content included in the camera image and virtual content associated with a vending service (e.g., a vending service associated with the vending kiosk). Step 1506 may be performed in any of the ways described herein.

In step 1508, the system directs the mobile device to display the augmented reality image. Step 1508 may be performed in any of the ways described herein.

Figure 16:
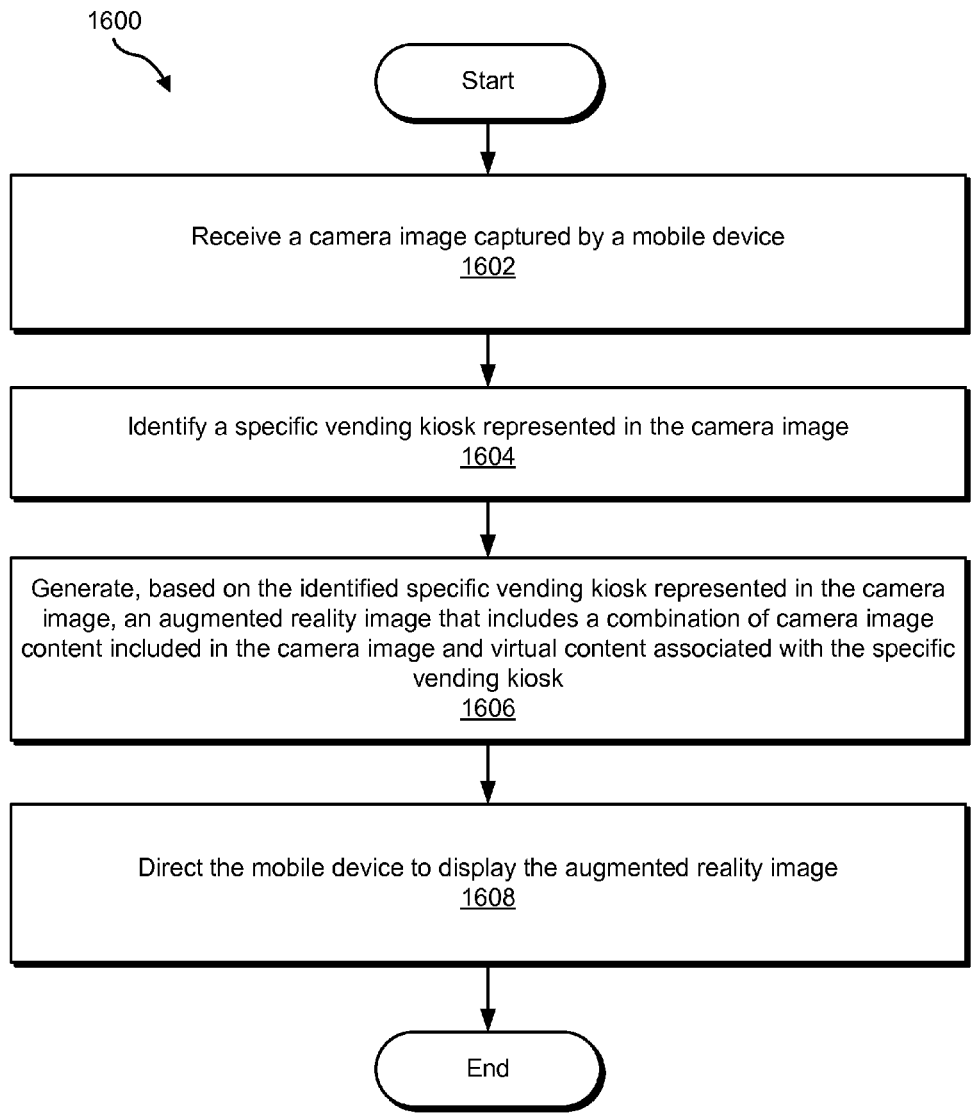

FIG. 16 illustrates an exemplary vending kiosk user interface method 1600 according to principles described herein. While FIG. 16 illustrates exemplary steps according to certain embodiments, other embodiments may omit, add to, reorder, combine, and/or modify any of the steps shown in FIG. 16. In certain embodiments, one or more of the steps shown in FIG. 16 may be performed by system 100, system 300, and/or one or more components or implementations of system 100 and/or system 300.

In step 1602, a vending kiosk user interface system receives a camera image captured by a mobile device. Step 1602 may be performed in any of the ways described herein.

In step 1604, the system identifies a specific vending kiosk represented in the camera image. Step 1604 may be performed in any of the ways described herein.

In step 1606, the system generates, based on the identifying of the specific vending kiosk represented in the camera image, an augmented reality image that includes a combination of camera image content included in the camera image and virtual content associated with the specific vending kiosk (e.g., current inventory of the specific vending kiosk). Step 1606 may be performed in any of the ways described herein.

In step 1608, the system directs the mobile device to display the augmented reality image. Step 1608 may be performed in any of the ways described herein.

Figure 17:
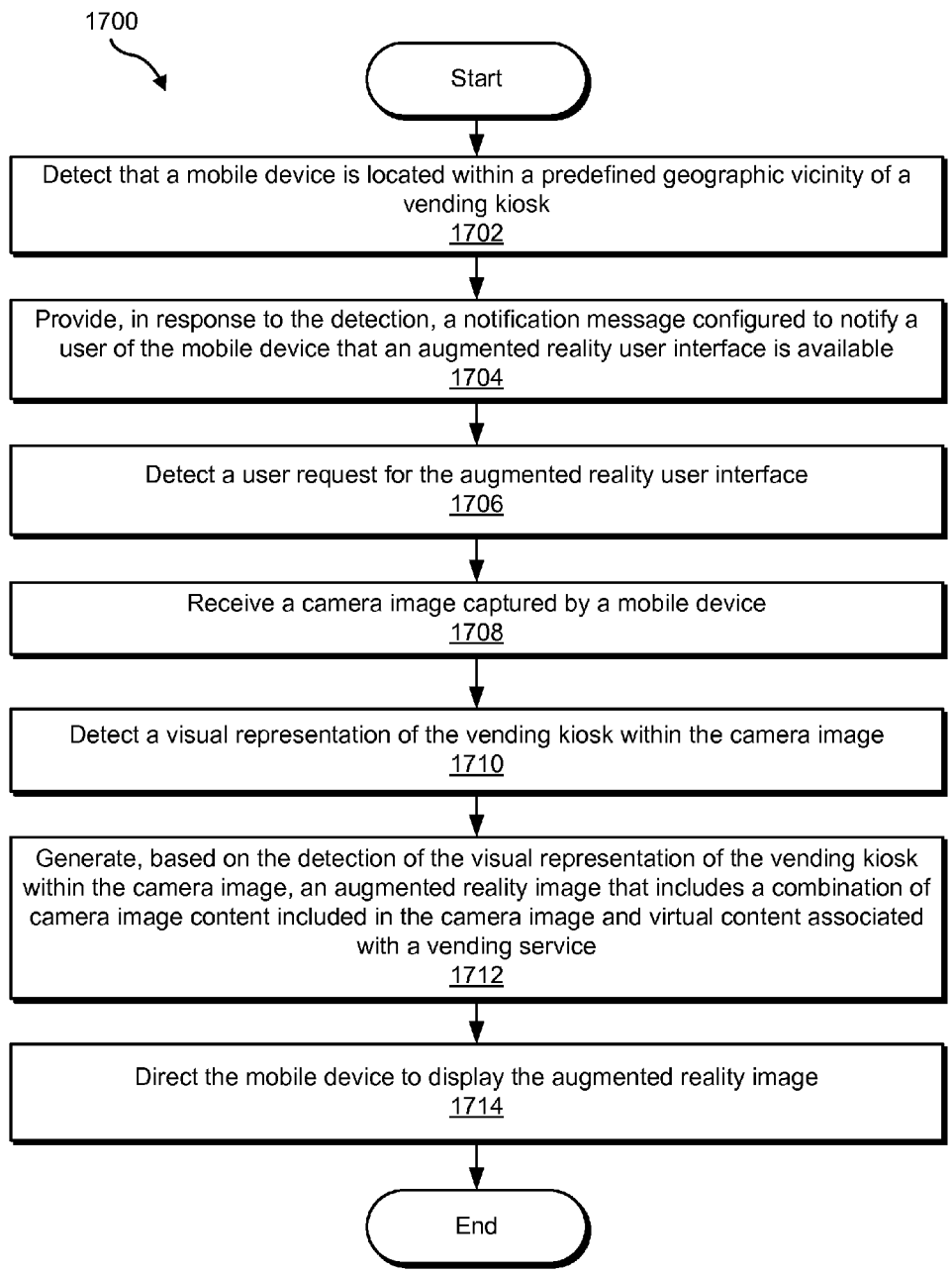

FIG. 17 illustrates an exemplary vending kiosk user interface method 1700 according to principles described herein. While FIG. 17 illustrates exemplary steps according to certain embodiments, other embodiments may omit, add to, reorder, combine, and/or modify any of the steps shown in FIG. 17. In certain embodiments, one or more of the steps shown in FIG. 17 may be performed by system 100, system 300, and/or one or more components or implementations of system 100 and/or system 300.

In step 1702, a vending kiosk user interface system detects that a mobile device is located within a predefined geographic vicinity of a vending kiosk. Step 1702 may be performed in any of the ways described herein.

In step 1704, the system provides, in response to the detecting, a notification message configured to notify a user of the mobile device that an augmented reality user interface is available. Step 1704 may be performed in any of the ways described herein.

In step 1706, the system detects a user request for the augmented reality user interface. Step 1706 may be performed in any of the ways described herein.

In step 1708, the system receives a camera image captured by a mobile device. Step 1708 may be performed in any of the ways described herein.

In step 1710, the system detects a visual representation of the vending kiosk within the camera image. Step 1710 may be performed in any of the ways described herein.

In step 1712, the system generates, based on the detecting of the visual representation of the vending kiosk within the camera image, an augmented reality image that includes a combination of camera image content included in the camera image and virtual content associated with a vending service (e.g., with vending kiosk inventory of the vending service and/or the vending kiosk). Step 1712 may be performed in any of the ways described herein.

In step 1714, the system directs the mobile device to display the augmented reality image. Step 1714 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 18:
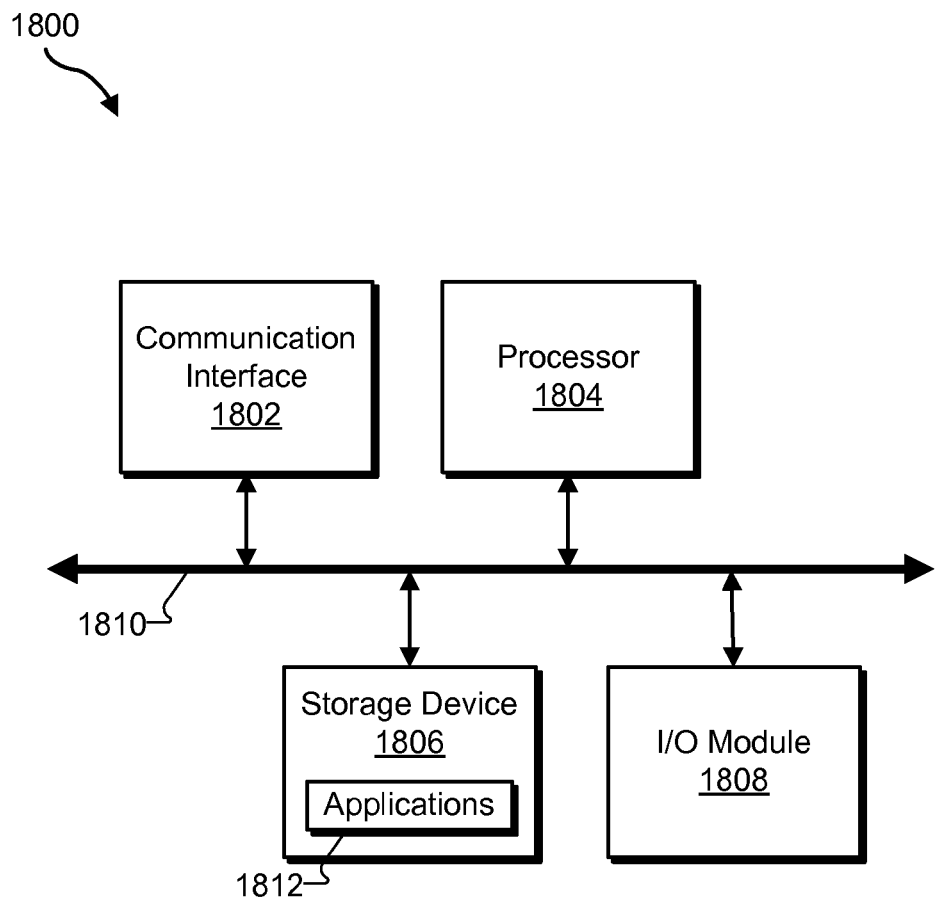
FIG. 18 illustrates an exemplary computing device according to principles described herein.

FIG. 18 illustrates an exemplary computing device 1800 that may be configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data or interpreting, executing, and/or directing execution of one or more of the instructions, processes, and/or operations described herein. Processor 1804 may execute and/or direct execution of operations as directed by one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1806. For example, data representative of one or more executable applications 1812 configured to direct processor 1804 to perform any of the operations described herein may be stored within storage device 1806. In some examples, data may be arranged in one or more databases residing within storage device 1806.

I/O module 1808 may be configured to receive user input and provide user output and may include any hardware, firmware, software, or combination thereof supportive of input and output capabilities. For example, I/O module 1808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1808 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with kiosk vending facility 102, kiosk management facility 104, user interface facility 106, identification facility 302, and/or augmented reality facility 304. Likewise, storage facility 108 and/or storage facility 306 may be implemented by or within storage device 1806. Such an implementation may be referred to as a computer-implemented system, such as a computer-implemented vending service system 100 or a computer-implemented vending kiosk user interface system 300.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a computer-implemented vending kiosk user interface system, a camera image captured by a mobile device, the camera image including a visual representation of a vending kiosk located within a vicinity of the mobile device;

detecting, by the computer-implemented vending kiosk user interface system, the visual representation of the vending kiosk within the camera image;

generating, by the computer-implemented vending kiosk user interface system based on the detecting of the visual representation of the vending kiosk within the camera image, an augmented reality image that includes a combination of camera image content included in the camera image and virtual content associated with a vending service; and directing, by the computer-implemented vending kiosk user interface system, the mobile device to display the augmented reality image;

wherein the virtual content associated with the vending service comprises a visual representation of a virtual store containing one or more virtual objects representing items offered as part of the vending service, the one or more virtual objects selected for inclusion in the virtual store in accordance with a customization of the virtual store by an end user of the mobile device.

2. The method of claim 1, further comprising:
identifying, by the computer-implemented vending kiosk user interface system from data specifying a plurality of vending kiosks associated with the vending service, a specific vending kiosk that is represented by the visual representation of the vending kiosk in the camera image;
wherein the generating of the augmented reality image is further based on the identifying of the specific vending kiosk.

3. The method of claim 2, wherein the generating comprises:
identifying a current inventory of the specific vending kiosk; and
selecting the virtual content for inclusion in the augmented reality image based on the current inventory of the specific vending kiosk.

4. The method of claim 3, wherein the one or more virtual objects represent at least part of the current inventory of the specific vending kiosk.

5. The method of claim 3, wherein the virtual content further comprises a visual representation of a promotion for an inventory item included in the current inventory of the specific vending kiosk.

6. The method of claim 1, wherein the generating comprises:
selecting a portion of the camera image based on at least one attribute of the visual representation of the vending kiosk in the camera image; and
overlaying the virtual content over the selected portion of the camera image.

7. The method of claim 1, wherein the vending kiosk comprises an automatic media disc rental machine.

8. The method of claim 7, wherein the visual representation of the virtual store visually represents an interior of a virtual media rental store premises.

9. The method of claim 1, wherein the receiving of the camera image captured by the mobile device comprises receiving a continuous video stream that includes the camera image.

10. The method of claim 1, wherein the virtual content associated with the vending service further comprises a visual representation of a user selectable option to enter the virtual store.

11. The method of claim 10, wherein the virtual content associated with the vending service further comprises a visual representation of a virtual assistant within the virtual store and configured to receive user commands from a user of the mobile device and to assist the user by at least one of:
providing information relating to an item represented in the virtual store,
offering a recommendation relating to the item represented in the virtual store, and
providing instruction relating to a feature of the virtual store.

12. The method of claim 1, wherein:
the directing comprises directing the mobile device to display the augmented reality image in an augmented reality graphical user interface view; and
the method further comprises directing, by the computer-implemented vending kiosk user interface system, the mobile device to transition from displaying the augmented reality image in the augmented reality graphical user interface view to displaying at least one of:
an additional augmented reality graphical user interface view that includes an additional augmented reality image containing additional virtual content, and
a fully virtual graphical user interface view that includes the additional virtual content.

13. The method of claim 1, further comprising:
detecting, by the computer-implemented vending kiosk user interface system, that the mobile device is located within a vicinity of the vending kiosk; and
providing, by the computer-implemented vending kiosk user interface system in response to the detecting that the mobile device is located within the vicinity of the vending kiosk, a notification message configured to notify a user of the mobile device that an augmented reality user interface is available.

14. The method of claim 1, embodied as computer-executable instructions on at least one non-transitory computer-readable medium.

15. The method of claim 1, wherein data representative of the customization is stored in a user profile associated with the end user of the mobile device.

16. The method of claim 1, wherein the customization includes an instruction to omit a particular genre of media content from the virtual store.

17. A method comprising:
receiving, by a computer-implemented vending kiosk user interface system, a camera image captured by a mobile device, the camera image including a visual representation of a vending kiosk located within a vicinity of the mobile device;
detecting, by the computer-implemented vending kiosk user interface system, the visual representation of the vending kiosk within the camera image;
identifying, by the computer-implemented vending kiosk user interface system from data specifying a plurality of vending kiosks, a specific vending kiosk that is represented in the camera image;
generating, by the computer-implemented vending kiosk user interface system based on the identifying of the specific vending kiosk represented in the camera image, an augmented reality image that includes a combination of camera image content included in the camera image and virtual content associated with the specific vending kiosk; and
directing, by the computer-implemented vending kiosk user interface system, the mobile device to display the augmented reality image;
wherein the virtual content associated with the specific vending kiosk comprises a visual representation of a virtual store containing one or more virtual objects representing items offered through the specific vending kiosk, the one or more virtual objects selected for inclusion in the virtual store in accordance with a customization of the virtual store by an end user of the mobile device.

18. The method of claim 17, wherein the generating comprises:
identifying a current inventory of the specific vending kiosk; and
selecting the virtual content for inclusion in the augmented reality image based on the current inventory of the specific vending kiosk.

19. The method of claim 18, wherein the one or more virtual objects represent at least part of the current inventory of the specific vending kiosk.

20. The method of claim 18, wherein the virtual content further comprises a visual representation of a promotion for an inventory item included in the current inventory of the specific vending kiosk.

21. The method of claim 17, embodied as computer-executable instructions on at least one non-transitory computer-readable medium.

22. A system comprising:
   at least one processor; and
   a user interface facility that directs the at least one processor to
      detect a visual representation of a vending kiosk within a camera image captured by a mobile device located within a vicinity of the vending kiosk,
      generate, based on the detection of the visual representation of the vending kiosk within the camera image, an augmented reality image that includes a combination of camera image content included in the camera image and virtual content associated with vending kiosk inventory, and
   direct the mobile device to display the augmented reality image,
   wherein the virtual content associated with vending kiosk inventory comprises a visual representation of a virtual store containing one or more virtual objects representing items associated with vending kiosk inventory, the one or more virtual objects selected for inclusion in the virtual store in accordance with a customization of the virtual store by an end user of the mobile device.

* * * * *